(12) United States Patent
Zondervan et al.

(10) Patent No.: US 7,574,711 B2
(45) Date of Patent: *Aug. 11, 2009

(54) SYSTEM FOR REPLAYING AND SYNCHRONIZING PATTERNS ON A CLIENT AND EXTERNAL DATA SOURCE DEVICES

(75) Inventors: Quinton Y. Zondervan, Boston, MA (US); Umair A. Khan, Fremont, CA (US)

(73) Assignee: NVIDIA International, Inc., St. Michael (BB)

( * ) Notice: Subject to any disclaimer, the term of this patent is extended or adjusted under 35 U.S.C. 154(b) by 1267 days.

This patent is subject to a terminal disclaimer.

(21) Appl. No.: 10/146,096

(22) Filed: May 14, 2002

(65) Prior Publication Data

US 2003/0115378 A1 Jun. 19, 2003

Related U.S. Application Data

(60) Provisional application No. 60/341,340, filed on Dec. 14, 2001, provisional application No. 60/283,781, filed on Apr. 12, 2001.

(51) Int. Cl.
*G06F 3/00* (2006.01)
*G06F 12/00* (2006.01)
*G06F 15/17* (2006.01)

(52) U.S. Cl. .................. 719/318; 707/201; 715/737; 715/854

(58) Field of Classification Search ......... 715/700–866, 715/513; 707/1–10, 101–104.1, 201; 717/101–134; 709/201–219; 719/311, 328, 318
See application file for complete search history.

(56) References Cited

U.S. PATENT DOCUMENTS 5,774,717 A * 6/1998 Porcaro ............... 707/202
5,832,218 A * 11/1998 Gibbs et al. ............ 709/203

(Continued)

OTHER PUBLICATIONS

U.S. Appl. No. 60/341,340, filed Dec. 14, 2001.

(Continued)

*Primary Examiner*—Meng-Ai An
*Assistant Examiner*—Charles E Anya
(74) *Attorney, Agent, or Firm*—Zilka-Kotab, PC

(57) ABSTRACT

A system, method and computer program product provide functionality via a non-natively coded application on a client device. Initially, user input is received on a device. A pattern is replayed on the device. Navigation of the pattern is managed. Data is retrieved based on the user input utilizing at least one connector, as specified in the pattern. Finally, the retrieved data is output. A system, method and computer program product are also provided for creating an application for a client device. The functionality of the desired application on a device is provided by selecting functional computer code that processes data. The functional computer code does not include coding to the native API's of the device. One or more connectors are selected and programmed to interface with programs on the device for retrieving data for processing. One or more output nodes are generated for outputting the processed data from the device. The functional computer code, connectors, and output nodes are stored in a device-resident pattern for installation on the device. The retrieved data is processed by the functional computer code upon replaying of the pattern for providing the functionality.

16 Claims, 24 Drawing Sheets

U.S. PATENT DOCUMENTS

| | | | | |
|---|---|---|---|---|
| 5,912,669 | A * | 6/1999 | Hsia | 715/854 |
| 6,138,245 | A * | 10/2000 | Son et al. | 713/400 |
| 6,826,553 | B1 * | 11/2004 | DaCosta et al. | 707/1 |
| 6,947,979 | B1 * | 9/2005 | Pon | 709/223 |
| 2002/0054090 | A1 * | 5/2002 | Silva et al. | 345/747 |
| 2002/0174106 | A1 * | 11/2002 | Martin | 707/3 |
| 2002/0174117 | A1 * | 11/2002 | Nykanen | 707/4 |
| 2004/0100507 | A1 * | 5/2004 | Hayner et al. | 345/855 |

OTHER PUBLICATIONS

U.S. Appl. No. 60/283,781, filed Apr. 12, 2001.
U.S. Appl. No. 09/942,047, filed Aug. 28, 2001.
U.S. Appl. No. 09/942,080, filed Aug. 28, 2001.
U.S. Appl. No. 09/953,372, filed Sep. 14, 2001.
U.S. Appl. No. 09/942,051, filed Aug. 28, 2001.

* cited by examiner

| Component | Description |
|---|---|
| XML | Web Connector. Connector that allows content/transactions available on the Web to be accessed. |
| Database (DB) | Connectivity via ODBC/JDBC to access data |
| SMTP | Connection to outgoing email |
| FTP | Incoming and outgoing ftp connections |
| SMS | Outgoing messages using the SMS protocol |

SYSTEM FOR REPLAYING AND SYNCHRONIZING PATTERNS ON A CLIENT AND EXTERNAL DATA SOURCE DEVICES

RELATED APPLICATIONS

This application claims priority from U.S. Provisional Patent Application Ser. No. 60/341,340 entitled SYSTEM, METHOD AND COMPUTER PROGRAM PRODUCT FOR CREATING DISCONNECTED MOBILE APPLICATIONS, filed Dec. 14, 2001; U.S. Provisional Patent Application Ser. No. 60/283,781 entitled SYSTEM, METHOD AND COMPUTER PROGRAM PRODUCT FOR THE RECORDING AND PLAYBACK OF TRANSACTION MACROS, filed Apr. 12, 2001; U.S. Patent Application entitled SYSTEM, METHOD AND COMPUTER PROGRAM PRODUCT FOR THE RECORDING AND PLAYBACK OF TRANSACTION MACROS, filed non-provisionally Aug. 28, 2001 under Ser. No. 09/942,047; U.S. Patent Application entitled SYSTEM, METHOD AND COMPUTER PROGRAM PRODUCT FOR PATTERN REPLAY USING STATE RECOGNITION, filed non-provisionally Aug. 28, 2001 under Ser. No. 09/942,080 (now abandoned); and U.S. Patent Application entitled INTERFACE FOR MOBILIZING CONTENT AND TRANSACTIONS ON MULTIPLE CLASSES OF DEVICES, filed non-provisionally Sep. 14, 2001 under Ser. No. 09/953,372 (now U.S. Pat. No. 7,185,286); each of which is assigned to common assignee Clickmarks, Inc., and herein incorporated by reference.

FIELD OF THE INVENTION

The present invention relates to computer-related transactions, and more particularly to quickly creating applications for a disconnected device without requiring coding to native API's.

BACKGROUND OF THE INVENTION

An application program interface (API—and sometimes spelled application programming interface) is the specific method prescribed by a computer operating system or by an application program by which a programmer writing an application program can make requests of the operating system or another application. An API can be contrasted with a graphical user interface or a command interface (both of which are direct user interfaces) as interfaces to an operating system or a program.

Each particular operating system has its own specific set of API's. Every time a developer wishes to create a new application, the developer must code to the API's of the operating system and any applications with which the new application will interact. For example, a new application for use on a system running MICROSOFT® Windows must code to the Windows API's. Thus, the developer must be well-versed in coding for the particular operating system.

However, even a seasoned programmer may occasionally make a mistake when coding to particular API's. An error in coding to even one API may cause the new application to malfunction or not even run at all. Thus, great care must be exercised when coding to the API's of the particular operating system. This takes a great amount of time. If there is an error, days and even weeks can be spent debugging the code.

The problem is compounded when a developer wishes to create a new application that interacts with another application that has its own API's. In this scenario, the developer must be versed in both types of API's: the operating system-specific API's and the application-specific API's. If the new application does not run, the developer may have to spend precious time testing the coding to both types of API's.

What is needed is a way to create applications without requiring coding to native API's, thereby significantly reducing development time from days to a few hours.

SUMMARY OF THE INVENTION

A system, method and computer program product provide functionality via a non-natively coded application on a client device. The application is represented as a graph of functional nodes (called states) that are transitioned as the user interacts with the application. This graph of states is called a pattern. States may encode e.g. a specific interaction with another application such as a database application, application logic in the form of scripting codes using a scripting language such as JavaScript (ECMAScript) or Visual Basic, user interactions such as displaying information to the user, or soliciting input from the user. To interact with the application, the user launches an interpreter, called the Pattern Replay Engine (PRE) which has been custom coded for each supported device operating system. The PRE manages the navigation of the pattern based on actions taken by the user, and application logic encoded in the pattern. Because the pattern is interpreted on the device by a device specific PRE, the pattern does not need to specify its actions or application logic in a device specific manner. Instead, the application developer can focus entirely on designing the application logic and user interface without concerning himself with the peculiar APIs of the target devices on which the application would be replayed.

States in the pattern are interpreted by means of a connector, which is a system module that interprets a specific type of state. For example, a database connector is used to interpret instructions provided in a database state, and to execute those instructions against a database engine.

In one embodiment, a synchronization pattern can be replayed for synchronizing data between the device and an external data source such as a server via some type of physical and/or wireless connection. Data synchronization is the act of transferring device resident data to e.g. a server database, and conversely, server resident data to the device. Data synchronization is an integral part of disconnected applications, in the case where the user may modifies data on the device while not connected to the network. These updates may need to be applied to a server resident database, and vice versa. The present invention allows the application developer to specify the synchronization logic in much the same way as the application itself is specified. Specifically, the synchronization logic is also represented as a pattern. However, this pattern is replayed at the server, when the device connects to the server and requests a synchronization. In particular this allows the application developer to create a pattern that retrieves data from applications through their user interface, using the concept of Interaction Level Programming (ILP). This may include data retrieved from a website, a windows application, a database, etc.

During synchronization additional data used by the system is synchronized to the device. Data that can be synchronized includes user profile information, electronic mail, another pattern including an updated pattern, etc. Preferably, the pattern is periodically replayed for retrieving data for later synchronization to the client device.

In another embodiment, user interface screens are included in the pattern. These screens are preferably stored as templates, to be filled in when the pattern is replayed, with specific data, either provided by the user, retrieved from a data source, and/or computed by the application. The screens may include UI elements such as buttons, input fields, select controls, etc. which are presented to the user for interacting with the application. Input entered by the user is available to the application as variables which can be used to update data in the database, and also can be displayed on subsequent screens.

As an option, pattern replay can be made dependent upon user profile information such as whether the user is authorized to run the pattern, how the pattern functions for a particular user, etc. Note that multiple user profiles can be stored on the device, allowing the device to be shared by multiple users. Further, the connector can interface with a program resident on the device such as a database, an electronic mail program, etc.; a network data site; a remote application (i.e., an application running on a machine external to the device); etc.

A system, method and computer program product are also provided for creating an application for a client device. The functionality of the desired application on a device is provided by selecting functional computer code that processes data. The functional computer code does not include coding to the native API's of the device. One or more connectors are selected and programmed to interface with programs on the device for retrieving data for processing. One or more output nodes are generated for outputting the processed data from the device. The functional computer code, connectors, and output nodes are stored in a device-resident pattern for installation on the device. The retrieved data is processed by the functional computer code upon replaying of the pattern for providing the functionality. In this way, a designer can quickly create an application for any device without having to worry about conforming to the requirements of the API's. The process of creating the application is preferably carried out in a visual manner, using a development environment commonly called a Studio (reference Studio patent).

In one embodiment, a connector for interfacing with a local data source is installed on the device. Such a local data source can be a database, file system, etc. Preferably, the user interface screens of the application are transcoded for display on the target device. This can be done at design time if the target device type is known. Thus, user interface screens stored in the pattern are ready for display, except for variable references in the output pages, which can be resolved during replay of the pattern. The user interface screens may be represented using a markup language such a HTML, XHTML, WML or other markup languages that could be used for this purpose. Alternatively, the user interface screens may be represented using device specific compiled computer code generated by the Studio. Compiled code may include e.g. Java byte codes, or processor specific binary machine codes.

Another method for creating an application for a client device is also provided. A device-resident pattern is created for installation on a client device. Again, the pattern is not coded to native application program interfaces of the client device. Rather, the pattern uses connectors that interface with existing programs and interfaces on the device, thereby circumventing the need for coding with native API's. The device-resident pattern provides functionality when replayed on the client device. The device-resident pattern is transferred to the client device, where it is replayed to provide the functionality. As an option, a synchronization pattern can be generated for managing a data communication between the client device and an external data source. The synchronization pattern can be used to e.g. retrieve data to be stored on the client device during synchronization.

DESCRIPTION OF THE PREFERRED EMBODIMENTS

Figure 1:
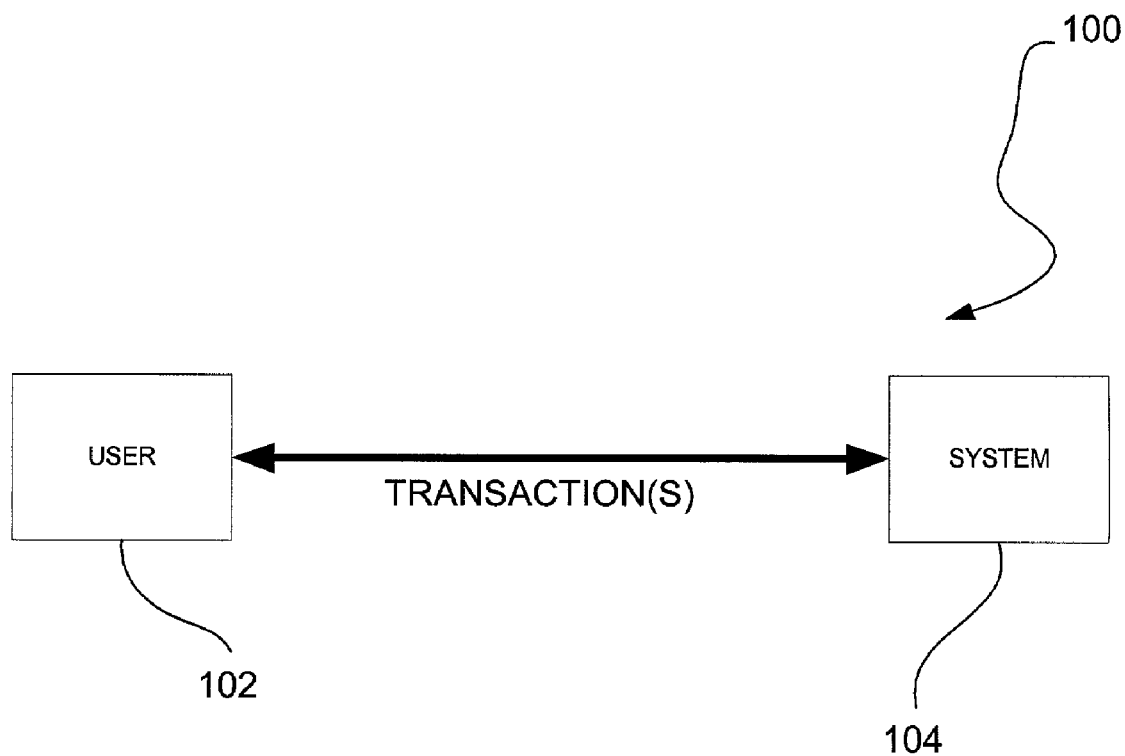
FIG. 1 illustrates a system including a user and a system, in accordance with one embodiment.

FIG. 1 illustrates a system 100 including a user 102 and a system 104, in accordance with one embodiment of the present invention. During use, the user 102 and the system 104 interact during transactions. In the present invention, a transaction refers to communicating (i) information and/or actions required to conduct the transaction, and/or (ii) information and/or actions sent back or desired by the user, respectively.

For example, a transaction, in one embodiment, may refer to: information submitted by the user, actions taken by the user, actions taken by a system enabling the access of the user to the data, actions taken by the data to retrieve/modify content, results sent back to the user, and/or any combination or portion of the foregoing entities.

Figure 2:
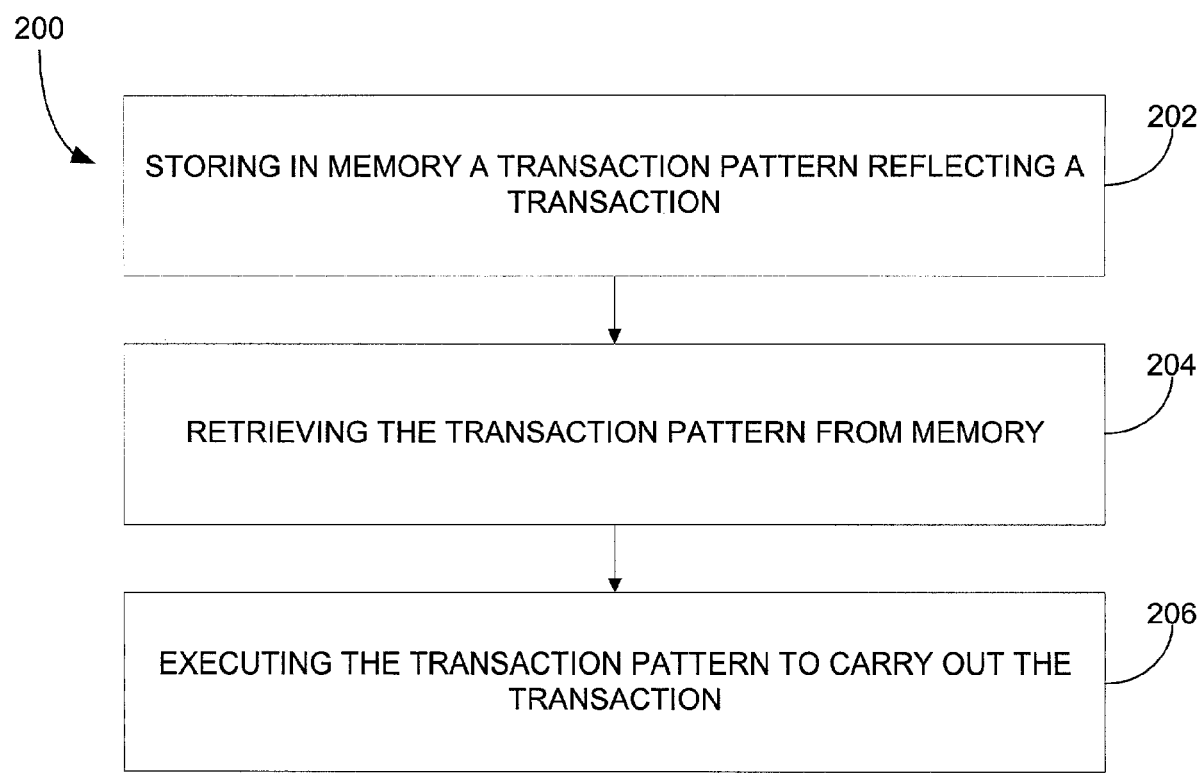
FIG. 2 illustrates a method for carrying out a computer-implemented transaction.

FIG. 2 illustrates a method 200 for carrying out a computer-implemented transaction. Initially, in operation 202 a transaction pattern reflecting a transaction is stored in memory. This may be carried out while the transaction is happening.

In one embodiment of the present invention, the transaction pattern may include a record of: information submitted by a user, actions taken by the user, actions taken by a system to generate results, and results sent to the user. As an option, the transaction pattern may include a record of actions taken by the system which enable access of the user to data, and actions enabled by the data to retrieve content. Storage in accordance with operation 202 may take any form with sufficient identification and description of any required step in the transaction process.

Figure 2A:
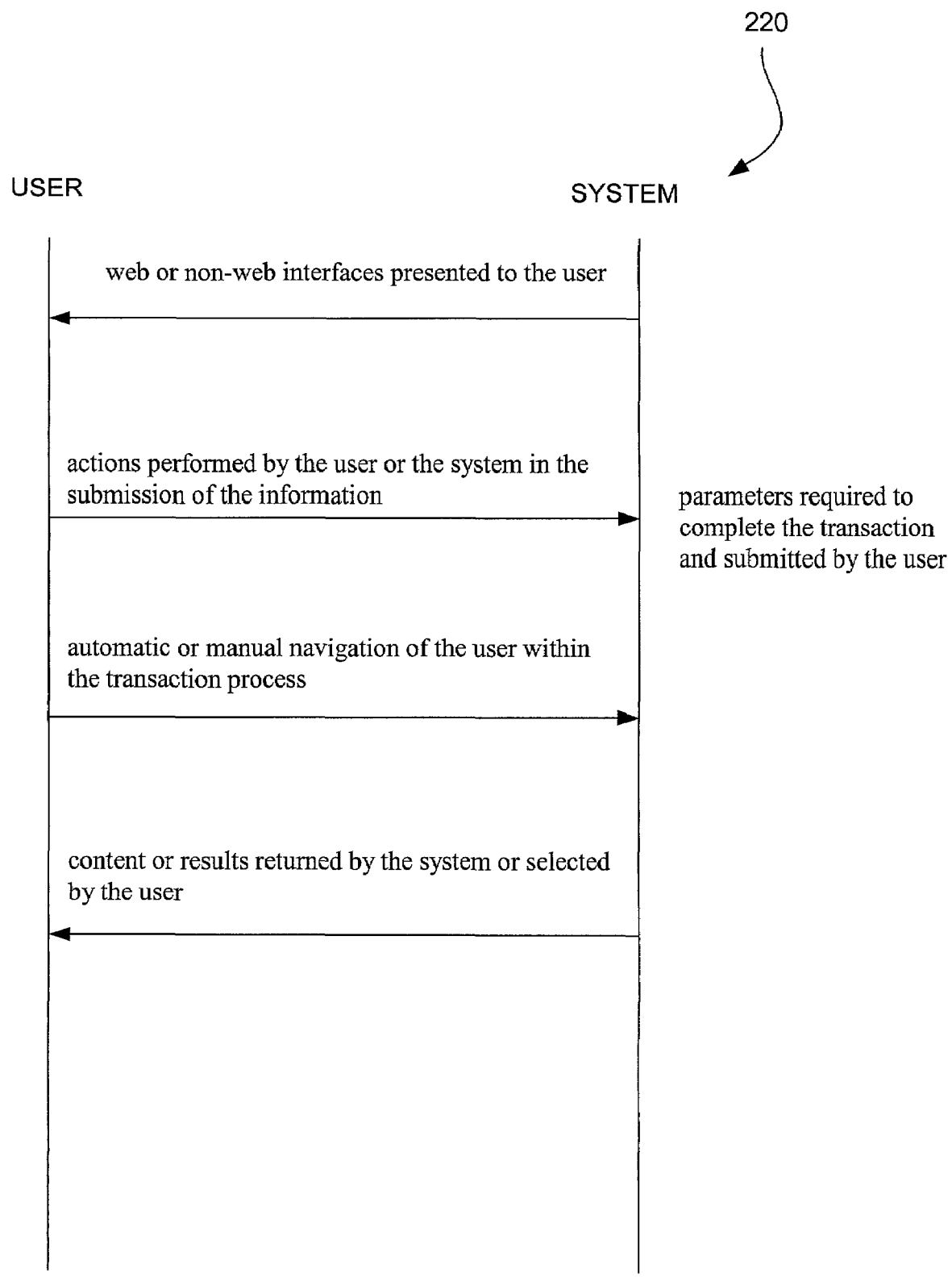
FIG. 2A illustrates an exemplary flow diagram showing information that may be stored with the transaction pattern.

FIG. 2A illustrates an exemplary flow diagram 220 illustrating the various information which may be stored during operation 202 of FIG. 2. For example, such information may involve (i) the web or non-web interfaces presented to the user, (ii) the actions performed by the user or the system in the submission of the information, (iii) the parameters required to complete the transaction and submitted by the user, (iv) the automatic or manual navigation of the user within the transaction process, and/or (v) the content or results returned by the system or selected by the user.

During use of the present invention, such transaction pattern may be retrieved from memory when desired in operation 204. Thereafter, the transaction pattern is executed to carry out the transaction in an automated manner. Note operation 206. An execution, or playback, in accordance with operation 206 may include the invocation of a stored transaction pattern.

Figure 2B:
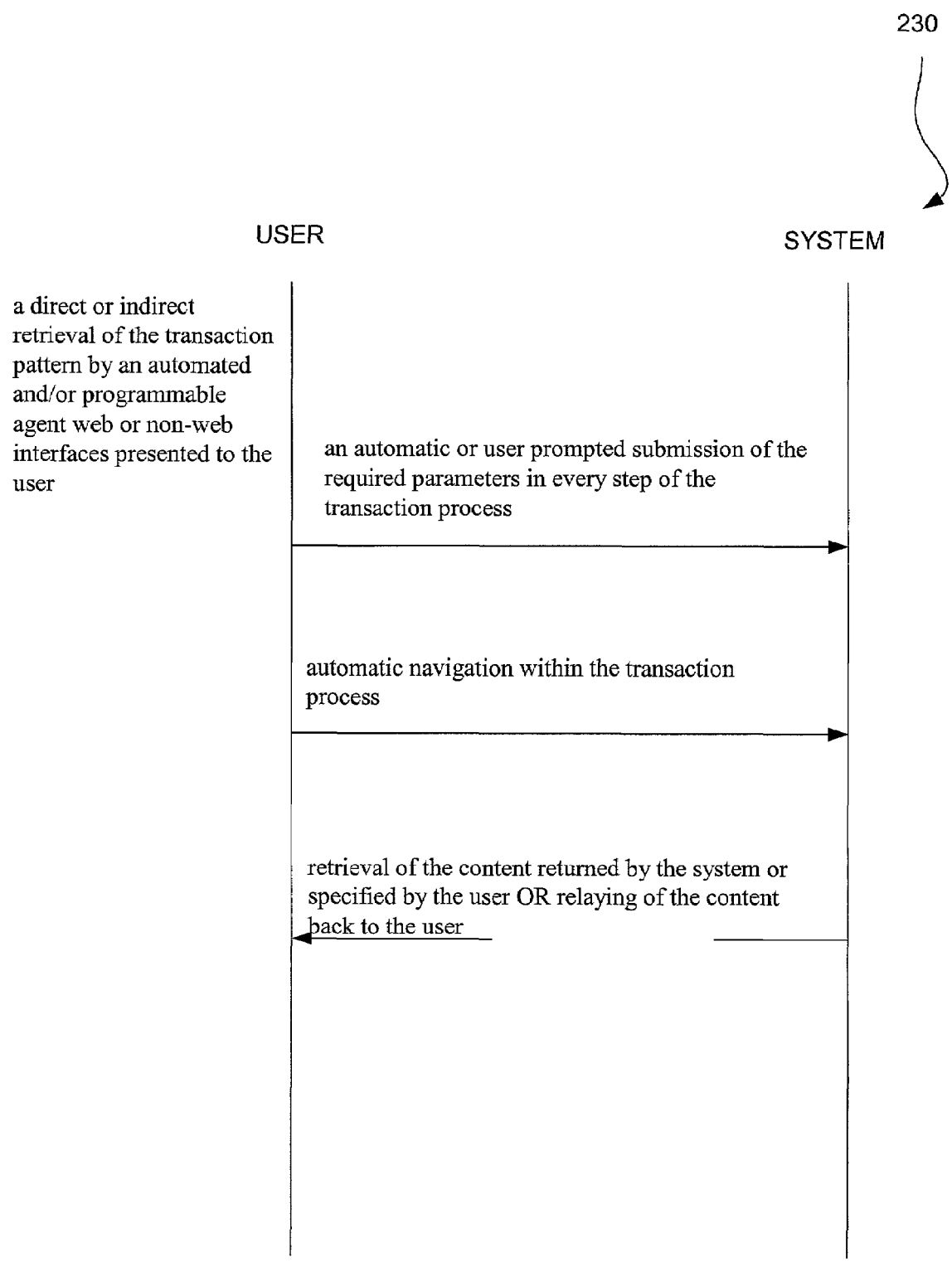
FIG. 2B illustrates an exemplary flow diagram showing the manner in which a transaction pattern may be executed.

FIG. 2B illustrates an exemplary flow diagram 230 illustrating the various operations that may occur during execution of a transaction pattern in accordance with operation 206 of FIG. 2. Such may involve: (i) a direct or indirect retrieval of the transaction pattern by an automated and/or programmable agent, i.e. a computer server/client, an active or dormant program, a human being, etc. (ii) an automatic or user prompted submission of the required parameters in every step of the transaction process, (iii) the automatic navigation within the transaction process, (iv) a retrieval of the content returned by the system or specified by the user, and/or (v) the relaying of the content back to the user.

A transaction pattern for any transaction need only be recorded once by anyone with sufficient system access privilege. Once recorded, any user may conduct that transaction, any number of times, by the invocation of the recorded transaction pattern, or "transaction macro."

Since a transaction macro can be stored in any fashion and invoked, directly or indirectly, by any agent (human or automated), it enables the completion of the transaction it describes in any fashion from any device.

System Architecture

Figure 3:
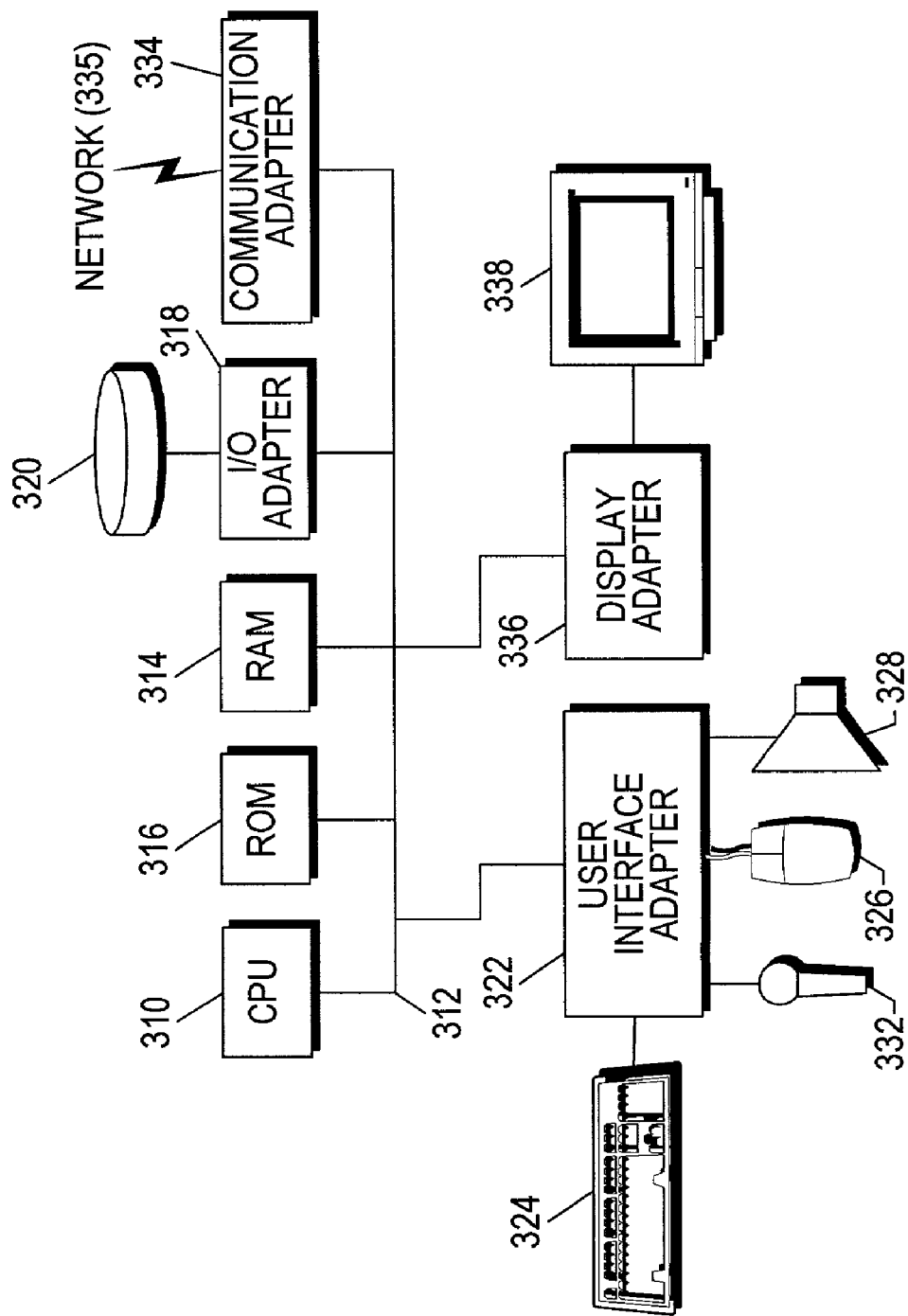
FIG. 3 shows a representative hardware environment on which the method of FIG. 2 may be implemented.

FIG. 3 shows a representative hardware environment on which the method 200 of FIG. 2 may be implemented. Such figure illustrates a typical hardware configuration of a workstation in accordance with a preferred embodiment having a central processing unit 310, such as a microprocessor, and a number of other units interconnected via a system bus 312.

The workstation shown in FIG. 3 includes a Random Access Memory (RAM) 314, Read Only Memory (ROM) 316, an I/O adapter 318 for connecting peripheral devices such as disk storage units 320 to the bus 312, a user interface adapter 322 for connecting a keyboard 324, a mouse 326, a speaker 328, a microphone 332, and/or other user interface devices such as a touch screen (not shown) to the bus 312, communication adapter 334 for connecting the workstation to a communication network 335 (e.g., a data processing network) and a display adapter 336 for connecting the bus 312 to a display device 338.

The workstation typically has resident thereon an operating system such as the Microsoft Windows NT or Windows/95 Operating System (OS), the IBM OS/2 operating system, the MAC OS, or UNIX operating system. Those skilled in the art may appreciate that the present invention may also be implemented on platforms and operating systems other than those mentioned.

Applications

Following is a plurality of exemplary applications of the present invention. It should be noted that such examples are not exhaustive, and should not be construed as limiting.

Scenario I

Figure 4:
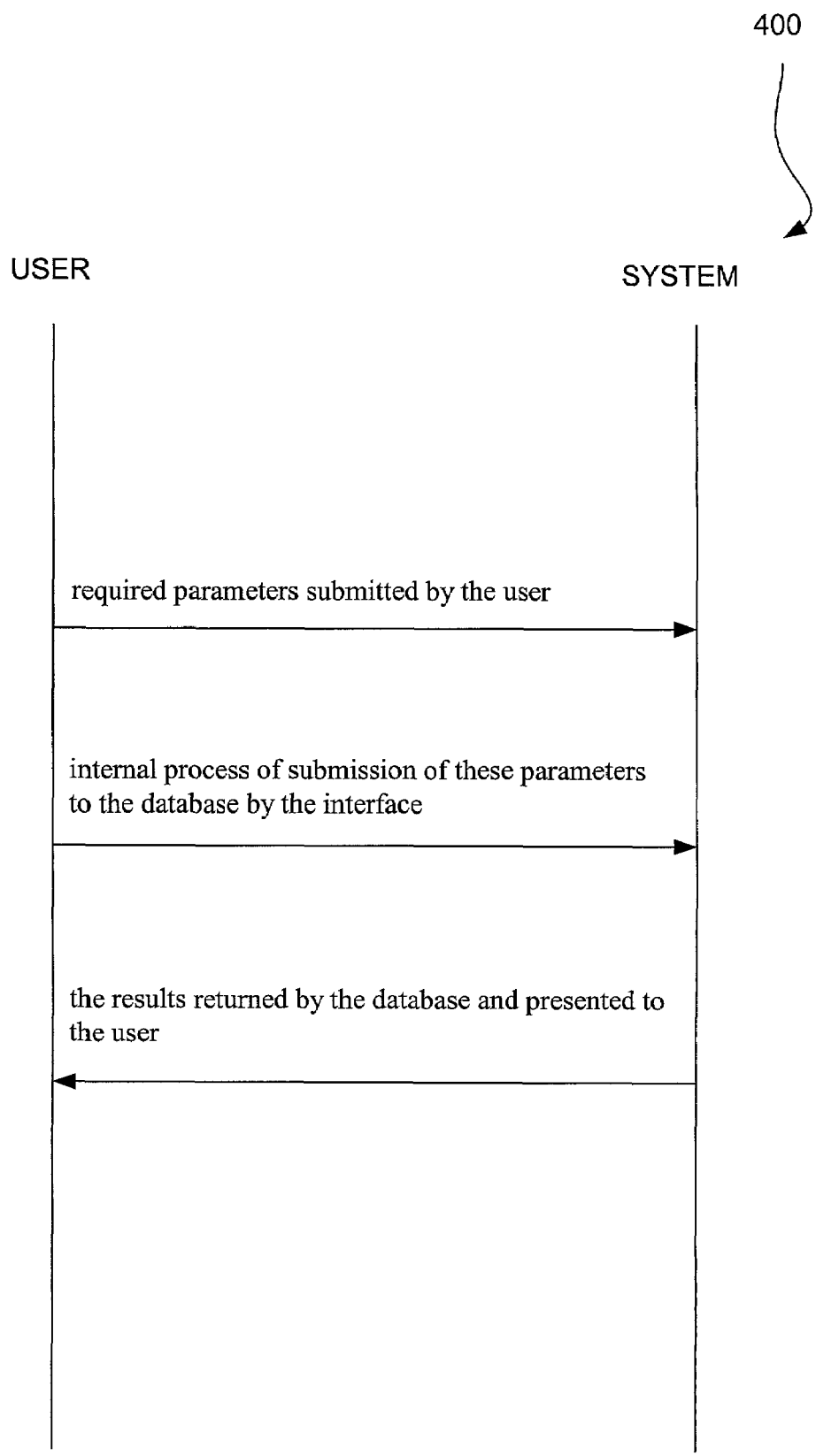
FIG. 4 illustrates an exemplary flow diagram illustrating the various components of a first exemplary transaction pattern.

FIG. 4 illustrates an exemplary flow diagram 400 illustrating the various components of a first exemplary transaction pattern. During operation, a user wishes to retrieve a record from a database. The retrieval of the record involves submitting the required parameters into an interface presented to the user for interacting with the database. Once the parameters are submitted, the results are sent back to the user in some predetermined manner.

In this case, the transaction pattern includes: (i) required parameters submitted by the user (ii) the entire internal process of submission of these parameters to the database by the interface and (iii) the results returned by the database and presented to the user. Note FIG. 4.

Scenario II

Figure 5:
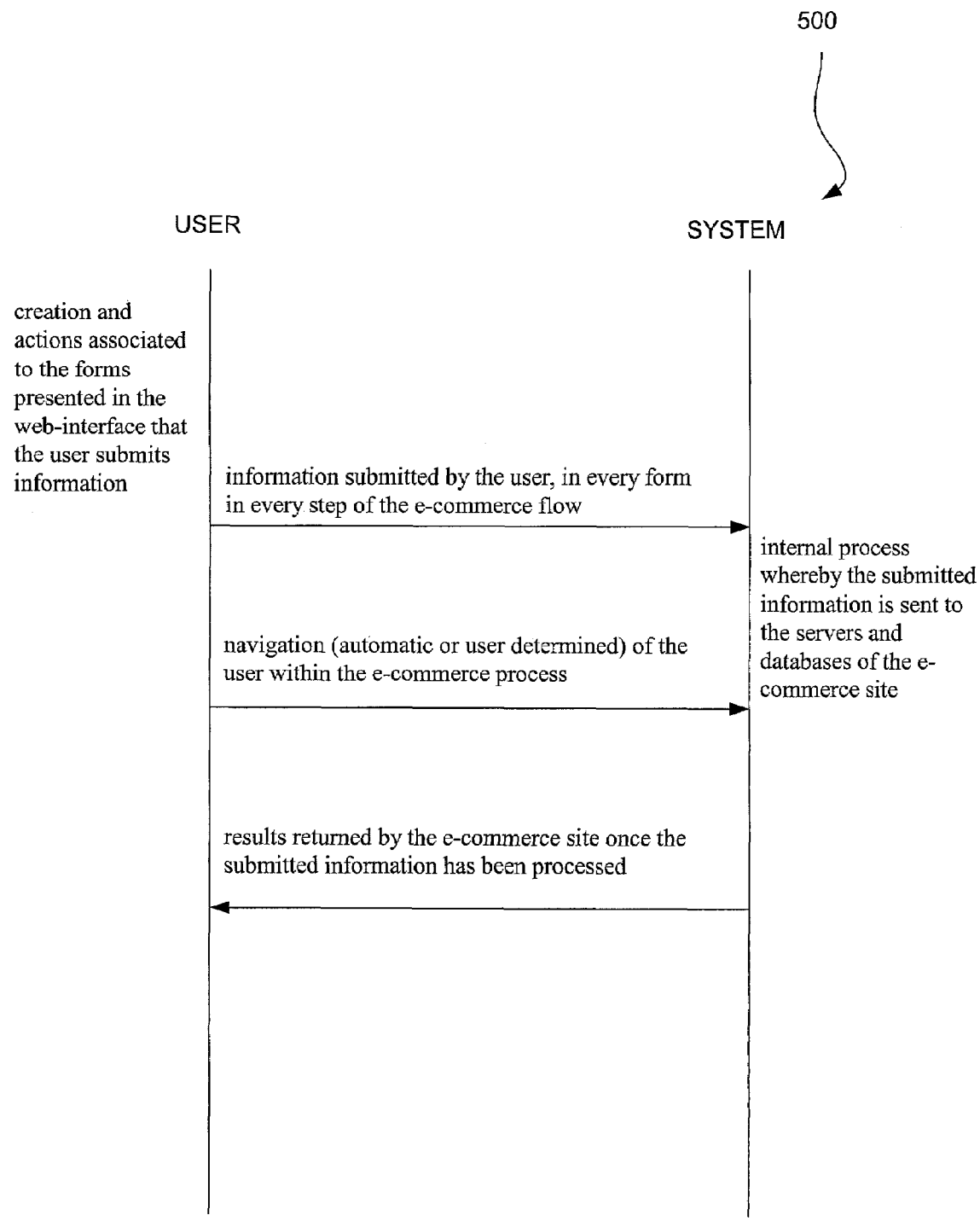
FIG. 5 illustrates an exemplary flow diagram illustrating the various components of a second exemplary transaction pattern.

FIG. 5 illustrates an exemplary flow diagram 500 illustrating the various components of a second exemplary transaction pattern. During operation, a user wishes to purchase an item from an e-commerce web site. The user interacts with the e-commerce interface presented on the web site and submits the required information to purchase the item. The user potentially fills out multiple forms (in multiple steps) that request the user's name, credit card information, shipping address, etc. Once the information has been entered, it is processed and the purchase is approved or rejected.

In this case, the transaction pattern consists of (i) the creation and actions associated with the forms presented in the web-interface with which the user submits information (ii) the information submitted by the user, in every form in every step of the e-commerce flow (iii) the internal process whereby the submitted information is sent to the servers and databases of the e-commerce site (iv) the navigation (automatic or user determined) of the user within the e-commerce process and (v) the results returned by the e-commerce site once the submitted information has been processed. Note FIG. 5.

Scenario III

Figure 6:
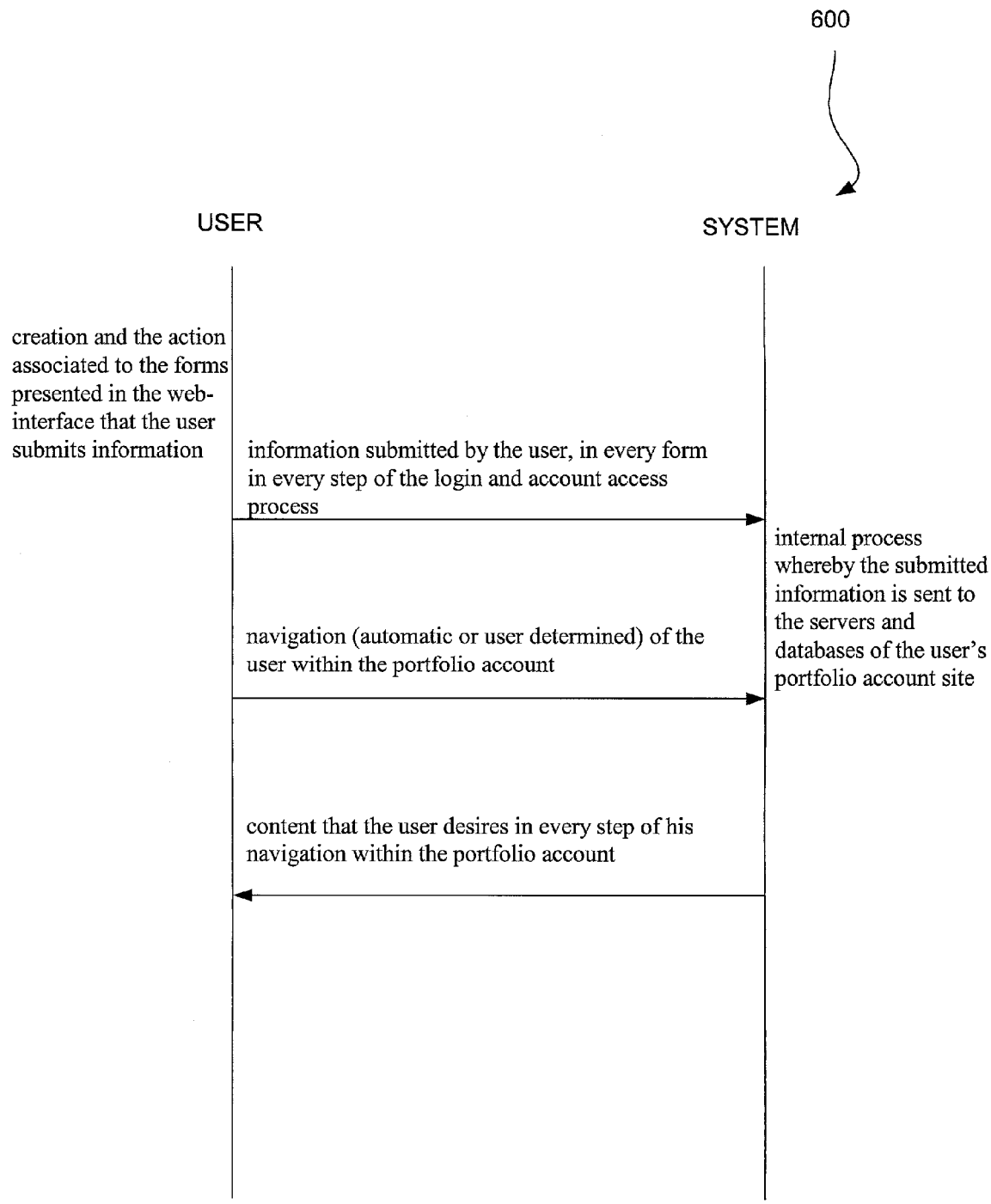
FIG. 6 illustrates an exemplary flow diagram illustrating the various components of a third exemplary transaction pattern.

FIG. 6 illustrates an exemplary flow diagram 600 illustrating the various components of a third exemplary transaction pattern. During operation, a user wishes to log into his stock portfolio account and view his portfolio. He supplies his username, password and potentially other information to gain secure access to this personal information. Once he is logged in, he wishes to view a table summarizing the performance of his stocks. To get to this table, he has to click on a series of hyperlinks, one after the other.

In this case, the transaction pattern consists of (i) the creation and the action associated with the forms presented in the web-interface with which the user submits information (ii) the information submitted by the user, in every form in every step of the login and account access process (iii) the internal process whereby the submitted information is sent to the servers and databases of the user's portfolio account site (iv) the navigation (automatic or user determined) of the user within the portfolio account and (v) all the content that the user desires in every step of his navigation within the portfolio account. Note FIG. 6.

In all of these scenarios, the user submits and retrieves different pieces of information in multiple steps. While it is possible to submit information in this fashion from a desktop computer, it becomes increasingly inconvenient once a user tries to do so through devices other than PC's where the entry of information is not as convenient. Therefore, a process whereby a query or a transaction can be completed and the resulting content sent to the user with a minimum amount of information input and navigation, is highly desirable.

The present invention thus allows any transaction to be automated through the concept of the recording and the playback of a "transaction macro."

Mobile Applications

The various embodiments described herein allow developers to quickly build a mobile application that runs on a device such as a disconnected device (not having a network connection all the time). Instead of coding to the native API's of the device, the developer builds a pattern, which is run on the device. Code that provides functionality upon its execution is stored in the pattern. Connectors interface with existing programs and interfaces on the device, thereby circumventing the need for coding to native API's.

The application is represented as a graph of functional nodes (called states) that are transitioned as the user interacts with the application. This graph of states is called a pattern. States may encode e.g. a specific interaction with another application such as a database application, application logic in the form of scripting codes using a scripting language such as JavaScript (ECMAScript) or Visual Basic, user interactions such as displaying information to the user, or soliciting input from the user. To interact with the application, the user launches an interpreter, called the Pattern Replay Engine (PRE) which has been custom coded for each supported device operating system. The PRE manages the navigation of the pattern based on actions taken by the user, and application logic encoded in the pattern. Because the pattern is interpreted on the device by a device specific PRE, the pattern does not need to specify its actions or application logic in a device specific manner. Instead, the application developer can focus entirely on designing the application logic and user interface without concerning himself with the peculiar APIs of the target devices on which the application would be replayed.

States in the pattern are interpreted by means of a connector, which is a system module that interprets a specific type of state. For example, a database connector is used to interpret instructions provided in a database state, and to execute those instructions against a database engine.

Disconnected operation is a user mode in which the user is operating an application on a client device that is not at the time connected to a network that would allow the application logic to reside on a server, and presentation elements to be served up to the device. In this mode, a significant portion of the application logic executes on the device itself, without requiring an active connection.

The various embodiments allow the application developer (designer) to create an application that consists of two closely related components:

1. Device-resident pattern—This is a pattern that is replayed on the device to provide the application functionality.
2. Synchronization pattern—This is an optional pattern that is called during synchronization to prepare or process the data being synchronized. Synchronization is the process of reconciling two data repositories, so that at the end of this process, both repositories are in a desired state that may include updates, additions and deletions made in the other repository.

Figure 7:
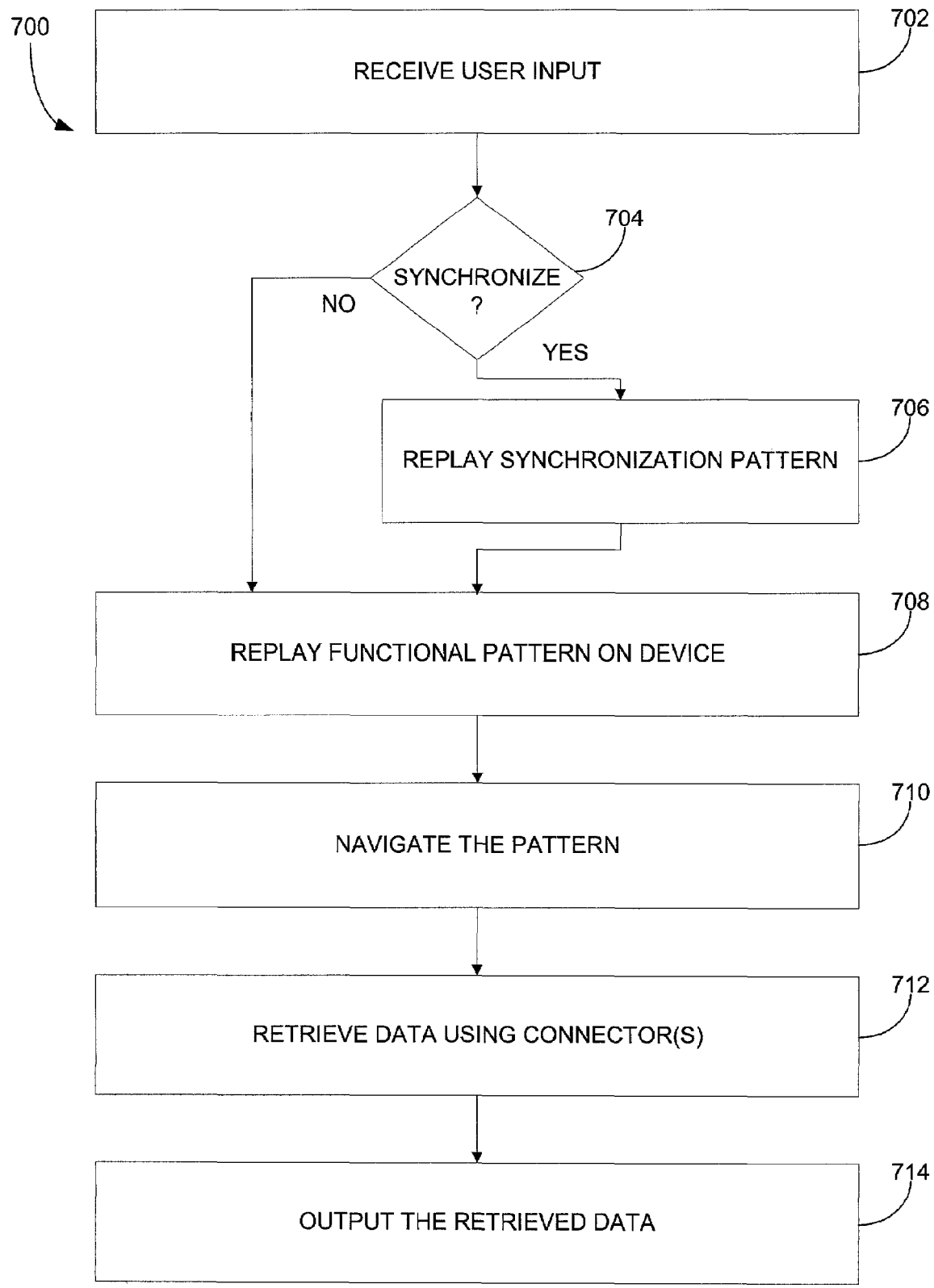
FIG. 7 is a diagram depicting a process for providing functionality via a non-natively coded application on a client device.

FIG. 7 is a diagram depicting a process 700 for providing functionality via a non-natively coded application on a client device. In operation 702, user input is received on the device. User input can include any user interaction, commands, etc. At decision 704, a determination is made as to whether a synchronization pattern is desired in light of the current application. Data synchronization is the act of transferring device resident data to e.g. a server database, and conversely, server resident data to the device. In operation 706, the synchronization pattern can be replayed to synchronize data between the device and an external data source such as a server via some type of physical and/or wireless connection. During synchronization additional data used by the system is synchronized to the device. Data that can be synchronized includes user profile information, electronic mail, another pattern (including an updated pattern), etc.

Data synchronization is an integral part of disconnected applications, in the case where the user modifies data on the device while not connected to the network. These updates may need to be applied to a server resident database, and vice versa. The present invention allows the application developer to specify the synchronization logic in much the same way as the application itself is specified. Specifically, the synchronization logic is also represented as a pattern. However, this pattern is replayed at the server, when the device connects to the server and requests a synchronization. In particular this allows the application developer to create a pattern that retrieves data from applications through their user interface, using the concept of Interaction Level Programming (ILP), as described in U.S. Provisional Patent Application Ser. No. 60/283,781 entitled SYSTEM, METHOD AND COMPUTER PROGRAM PRODUCT FOR THE RECORDING AND PLAYBACK OF TRANSACTION MACROS, filed Apr. 12, 2001 and from which priority is claimed. This may include data retrieved from a website, a windows application, a database, etc.

With continued reference to FIG. 7, in operation 708, the functional pattern is replayed on the device. The pattern includes a collection of states, each state including logic for interacting with another program. Navigation of the pattern is managed in operation 710 based the user input and/or application logic of the pattern. Data is retrieved from the other program in operation 712 based on the user input utilizing at least one connector, as specified in the pattern. In operation 714, the retrieved data is output.

The synchronization pattern is optional, as the application may or may not require it. There may be standalone applications that do not require a data synchronization component. One example is a calorie counting application, which can be used to keep track of how many calories are being consumed. In this example, the data entered by the user is not synchronized to the server. When the application is first synchronized to the device, a database of foods and calories for those foods is synchronized to the device and stored thereon. On the device the user enters what was eaten by picking from the list in the database, or entering custom data. The application calculates average daily caloric consumption, displays a graph, etc.

There may also be applications that only require simple synchronization of data. For example, the calorie counting program above may require that the foods database be synchronized back to the device whenever it is updated. However this would be a very simple synchronization: synchronize "Foods" table to device. A slightly more complicated synchronization Would be: synchronize "Foods" table updates to device, and synchronize device updates to "Foods" table back to the server. Updates such as these may not necessarily require a pattern per se; static SQL statements indicating what to synchronize can be used.

A more complex example would be an application that requires extensive processing before, after or during synchronization of the data. For example, in the calorie application, the list of foods and their caloric values may be available through a web interface. In this case a synchronization pattern would use an XML connector to retrieve this data from the web site, and copy it into a database table. This is not a simple copy. JavaScript is used to pick apart the HTML, and format the data into a two-column table: food item and calories. Finally, this table is synchronized to the device. This would be a complex synchronization pattern, which would be run during every synchronization. The pattern could also check the system time, and only update the table from the website once a week, once a month, etc. to minimize processing.

The example above also illustrates how the XML connector can be used in disconnected applications.

A third type of pattern is a background, or cron, pattern. This is a pattern that runs periodically in the background, possibly fetching data from a website or other source, and populating database tables that are later synchronized to the device. Thus a cron pattern could be used in much the same way as a synchronization pattern described above, where the pattern runs periodically on a fixed schedule, rather than during synchronization itself. This may be a more efficient solution in some cases, especially if the data is shared among many users.

User Experience on the Device

This section briefly describes an exemplary user experience on the device when using a disconnected application created and deployed as described herein. This section makes use of the calorie counting application example introduced above.

There are at least two possible ways for the user to launch the calorie application:
1. By launching the mobile client application on the device, and selecting the calorie application from the list of available patterns.
2. By opening the calorie application file, which launches the mobile client application because the file extension has been mapped.

A separate session may be maintained for each mobile application that is active.

When the user launches the mobile client as in option 1 above, they are first asked to be authenticated, such as by entering a user ID and/or password. The user is then presented with a list of applications, some of which may already be active. If the user selects an active application, the last output screen presented by that application is output (displayed) and the user can continue interacting with the application from that point. If the user selects an application for which a session for that user does not exist yet, a new session is created, and the application starts replaying from the beginning.

When the user launches the application as in option 2 above, the mobile client application is launched immediately. If an active session exists for the application that was launched, the user immediately is taken to the last output presented by that application. If not, the user is asked to authenticate, and a new session is created.

The session can time out. Two exemplary session timeouts are:
 1. Security timeout—The session is dormant, and can only be re-activated by the user authenticating.
 2. System timeout—The session is destroyed.

Preferably, the security timeout is of shorter duration than the system timeout, unless no security is desired, in which case the security timeout is preferably set to the maximum possible value. Both parameters can be system-wide and set by the administrator. Values smaller than the system defaults can be set for applications that require extra security.

The security timeout can be checked whenever the session is accessed, and, as an option, can be reset only when the user successfully re-authenticates.

The system timeout is preferably checked on a regular basis by a background thread. If the device does not support background threads, then the timeout is checked whenever the mobile client runs.

Once an application is launched by the user, two ways for the session associated with that application to end are:
 1. Explicitly by the user terminating the application.
 2. Implicitly by the system timing out the session.

All critical user data can be persisted to a database during application replay and prior to session termination so that the data is saved upon termination of the session.

User interface screens can be included in the pattern. These screens are preferably stored as templates, to be filled in when the pattern is replayed, with specific data either provided by the user, retrieved from a data source, and/or computed by the application. The screens may include UI elements such as buttons, input fields, select controls, etc. which are presented to the user for interacting with the application. Input entered by the user is available to the application as variables which can be used to update data in the database, and also can be displayed on subsequent screens.

The user interface screens may be represented using a markup language such a HTML, XHTML, WML or other markup languages that could be used for this purpose. Alternatively, the user interface screens may be represented using device specific compiled computer code generated by the Studio. Compiled code may include e.g. Java byte codes, or processor specific binary machine codes.

Creation of Disconnected Applications

Figure 8:
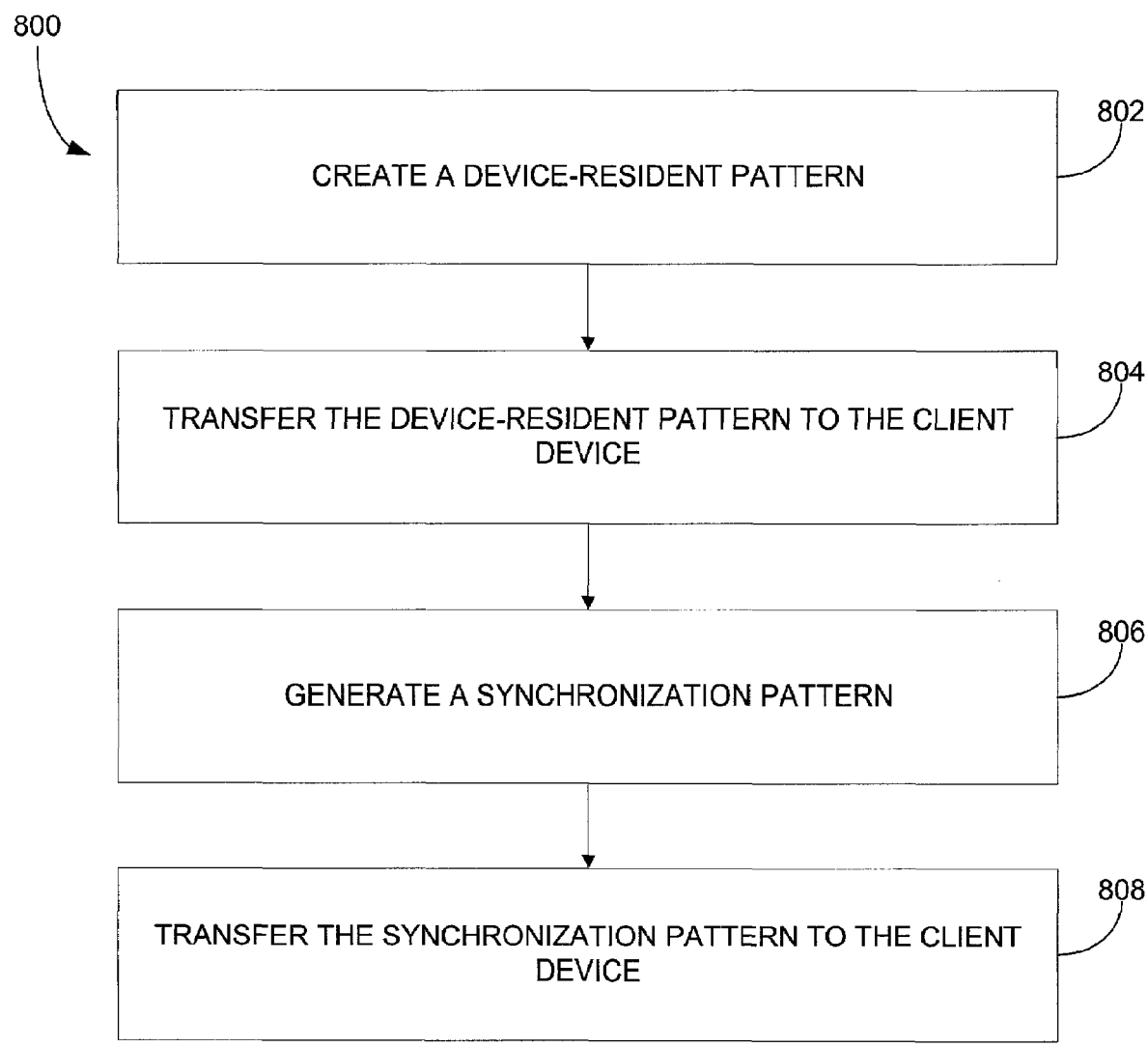
FIG. 8 is a flowchart of a process for creating an application for a client device.

FIG. 8 is a flowchart of a process 800 for creating an application for a client device. In operation 802, a device-resident pattern is created for installation on a client device. The pattern is not coded to native application program interfaces of the client device. Rather, the pattern uses connectors that interface with existing programs and interfaces on the device, thereby circumventing the need for coding with native API's. The device-resident pattern provides functionality when replayed on the client device. In operation 804, the device-resident pattern is transferred to the client device, where it is replayed to provide the functionality. As an option, a synchronization pattern can also be generated for managing a data communication between the client device and an external data source. Note operation 806. If a synchronization pattern is created, it is transferred to the client device in operation 808.

Note that the synchronization pattern does not necessarily need to be transferred to the client device. Rather, it can be stored and replayed on a server to which the device connects during synchronization, for example.

Figure 9:
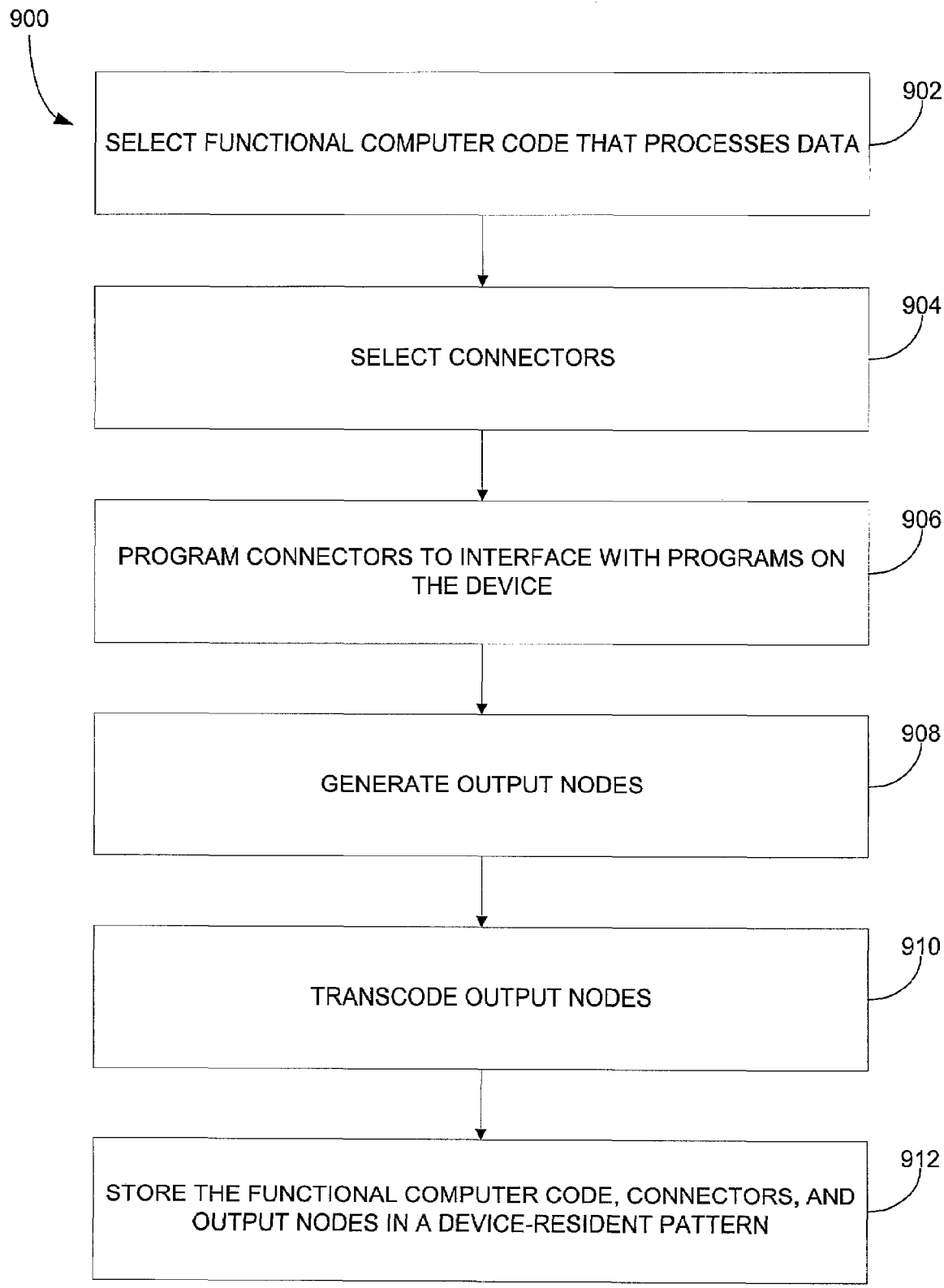
FIG. 9 is a flow diagram of another process for creating a mobile client application for a client device.

FIG. 9 is a flow diagram of another process 900 for creating a mobile client application (disconnected application) for a client device. The functionality of the desired application on a device is provided by selecting functional computer code that processes data. See operation 902. The functional computer code does not include coding to the native API's of the device. In operations 904 and 906, one or more connectors are selected and programmed to interface with programs on the device for retrieving data for processing. A connector for interfacing with a remote data source can also be stored in the device-resident pattern. Such a remote data source can be a server, website, database, etc. accessible via some type of physical or wireless connection.

As shown in FIG. 9, one or more output nodes are generated in operation 908 for outputting the processed data from the device. The output nodes of the pattern are transcoded in operation 910 for specifying a format of output on the device. This can be done at design time if the device type is known. Thus, output pages stored in the pattern are ready for display, except for variable references in the output pages. Preferably, variable references in the output nodes are resolved during replay of the pattern.

In operation 912, the functional computer code, connectors, and output nodes are stored in a device-resident pattern for installation on the device. The retrieved data is processed by the functional computer code upon replaying of the pattern for providing the functionality. In this way, a designer can quickly create an application for any device without having to worry about conforming to the requirements of the API's. As an option, a synchronization pattern can be generated for managing a data communication between the device and an external data source.

The process of creating the application is preferably carried out in a visual manner, using a development environment commonly called a Studio. Such a visual development environment is set forth in copending U.S. Patent Application entitled INTERFACE FOR MOBILIZING CONTENT AND TRANSACTIONS ON MULTIPLE CLASSES OF DEVICES, filed non-provisionally Sep. 14, 2001 under Ser. No. 09/953,372 (now U.S. Pat. No. 7,185,286), and from which priority is claimed.

Functional Components

This section describes several functional components used to create and run the disconnected application.

The platform described in U.S. patent application Ser. No. 09/942,080 (now abandoned) entitled SYSTEM, METHOD AND COMPUTER PROGRAM PRODUCT FOR PATTERN REPLAY USING STATE RECOGNITION, from which priority is claimed, gives its users the ability to create (record) functional elements called patterns and use those elements (replay) in their custom applications. A pattern consists of a collection of states. State refers to the state of the application as defined by the user of the platform (the designer). States can be of different types. For example, an action that requires accessing the World Wide Web can be represented by an XML (or other type) state and an action that would require sending e-mail can be a part of an SMTP state. Each type of state has a connector, which is used to create the state definitions and operate on those states. Thus, an XML Connector Module (XCM) is the connector that aids in recording and replaying of XML states. A database connector is used to store and retrieve data from a database, but may or may not point to a next state. An XML Connector points to a next table. For example, the XML Connector in state A would instruct an agent to execute action X to access state C.

The information stored in a pattern may involve (i) the web or non-web interfaces presented to the user, (ii) the actions performed by the user or the system in the submission of the information, (iii) the parameters required to complete the transaction and submitted by the user, (iv) the automatic or manual navigation of the user within the transaction process, (v) processing of data to provide functionality, and/or (vi) the content or results returned by the system or selected by the user.

Since a transaction pattern can be stored in any fashion and invoked, directly or indirectly, by any agent (human or automated), it enables the completion of the transaction it describes in any fashion from any device.

Mobile Connectors

The connectors interface with programs and interfaces resident on the device such as a database, an electronic mail program, etc. Connectors can also interface with programs and interfaces not resident on the device, such as a network data site, an electronic mail server, a remote application (i.e., an application running on a machine external to the device), etc.

Figure 10:
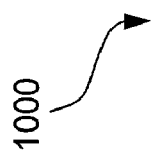
FIG. 10 is a table depicting several illustrative connectors according to one embodiment.

FIG. 10 is a table 1000 depicting several illustrative connectors, including Database (DB) and Simple Mail Transfer Protocol (SMTP) Connectors, and functions of the connectors.

Mobile Output Editor (MOE)

The Mobile Output Editor allows a user interface to be built for supported disconnected devices. The MOE allows the user to specify how data is output on the device. The MOE may be part of the Interactive Design Tool, described below.

Interactive Design Tool (IDT)

The Interactive Design Tool according to one embodiment allows a user to mobilize content and transactions on to multiple classes of devices. Some specific examples of the use of the IDT include:

- Mobilize an existing web application (manipulate the data for output on a mobile device).
- Create a new mobile application based partially on existing content from the web, a database etc. (For example, giving a salesperson the ability to mark an order as closed from a mobile device resulting in a legacy database system being updated.)
- Create a Web Integration application based on the interaction of multiple existing web applications.
- Configure the basic view presented by the mobilization platform (i.e. editing the application layout schema). Note that this last feature is conceptually different from the first three as it operates at a "higher" level; it defines the containers within which the various applications defined in the first three cases above may appear.

Application Views

The IDT graphical user interface provides several views according to one embodiment.

Workplace View

The first view is the Workplace view. Workplace views are the views within which the designer specifies the content and/or transaction by example. For example, while mobilizing web content, the Web Workplace presents a browser view to the designer where the designer can indicate specific content by clicking on the areas of interest. The workplace records the usage pattern in the background. If the designer is mobilizing content stored in a database, the Database Workplace displays the appropriate database connection dialogs. Thus, the workplace is at all times, aware of the class of content/transactions the designer is mobilizing and provides the appropriate view. The designer accesses content with multiple types of connectors. Connectors are functional blocks that allow access via various methods such as Web, database connectivity, FTP, etc.

Pattern View

The Pattern View is a view where the designer is able to manipulate the properties of the pattern. The Pattern View can also allow the designer to create a pattern manually and/or add pattern elements directly. Several functions enabled by the Pattern View follow. Also, see FIGS. 11-18 and related discussion for examples of pattern views.

The Pattern View allows formal pattern specification. Especially for web patterns, the pattern recorded in the Workplace represents only one possible interaction path. For example, the pattern may only represent a successful login into an online account. However, in actual usage, a user may also encounter an unsuccessful login. The Pattern View is used to visually specify such alternate paths in a flowchart format. Note that formal specification may be needed not just for the web connector. For example, some connectors may require error handling alternate interaction paths. See the section on Recording Alternate Paths, below, for further details.

The Pattern View also enables cross-connector flow, including design of complex interactions that span multiple types of connectors. For example, consider an interaction that obtains content like stock quotes from the web and inserts them into a database. The two pieces of this interaction (web and database) are individually recorded within the Workplace. However, the Pattern View is where the information flow across these pieces is coupled, or "glued," together.

A pattern may be divided into multiple segments. For example, a pattern which aims to check on the price using a price comparison engine and then purchase the item, might be first divided up into two segments (one for the comparison and one for the purchase). The designer can eventually link the individual segments together while applying appropriate selection and transformation using scripts.

Device Editor View(s)

The Device Editor View(s) is a view where the designer is able to specify the view and interaction of the Client Devices as it relates to the pattern under design. For example, consider a pattern for retrieving bank account information. Within the Workplace and Pattern View, the designer is able to specify how to fetch the account information while navigating through multiple web screens. In the Device Editor, the designer may specify, for example, two screens: one in which the bank account number is entered and a second where the account balance is displayed. The Device Editor View is able to accommodate design for multiple classes of devices (e.g. phones, PDAs, etc.). Further, the Device Editor View(s) can function as the screen editors for specific clients, and can depict an accurate rendering of what the client device displays. See FIG. 19 and related description for an illustrative Device Editor View.

Script Editor View

Within the Script View, the designer is able to edit Javascript to manipulate the data flow within the pattern and also serve as gluing logic.

Utility Views

These are views used to enhance the user experience and provide useful information at various points. One Utility View is a Project Explorer. The Project Explorer displays all elements defined in the project thus far in a tree format. The main branches of the tree can include: Pattern (which contains all the states defined thus far in the Pattern View grouped into segments), Scripts (all scripts defined), and/or Session Data.

Another Utility View is a Data Explorer. Using the Data Explorer, the designer is able to create and inspect the data variables. These variables can be created for a given pattern and/or can be predefined and provided in a database of the mobilization platform. The variables can be of basic data types but also can belong to User Defined data types that can also be created via this View. These variables are available to be used in different views.

A further Utility View is a Pattern Gallery, which displays a list of available patterns that can be re-used. Various properties of the patterns (inputs, outputs, description, last modification date, etc.) can be shown.

Replay Mode (Testing and Debugging)

According to one embodiment, once a pattern has been recorded, the IDT can be used to replay the pattern. This is critical for testing and debugging the pattern. The designer will have the ability to set breakpoints, step through the pattern and set up variable watch windows to trace the execution of the pattern. Since the pattern is interpreted, it may be possible to stop at a breakpoint, change the pattern that is supposed to follow, and re-start execution of the pattern.

IDT Output

According to an embodiment, the IDT can generate XML descriptions of the pattern called Pattern XML (or other suitable name), the mobile views generated and the data transformations, etc. designed within the data view. In addition, the scripts written by the designer are also recorded. The IDT also stores the current project in a binary document (uses MFC object serialization mechanisms), which has the information of the Pattern defined so far. The project file can be called "Company Process Document" (*.cpd files) or other suitable name.

Exemplary Pattern Recording Scenario

Pattern recording is done through the IDT interface that allows the user to quickly and easily record patterns. More particularly, a described in the following paragraphs, the IDT interface allows creation of an application for retrieving a variable from a database as well as creation of an interface for displaying the variable on a particular type and/or model of device.

Figure 11:
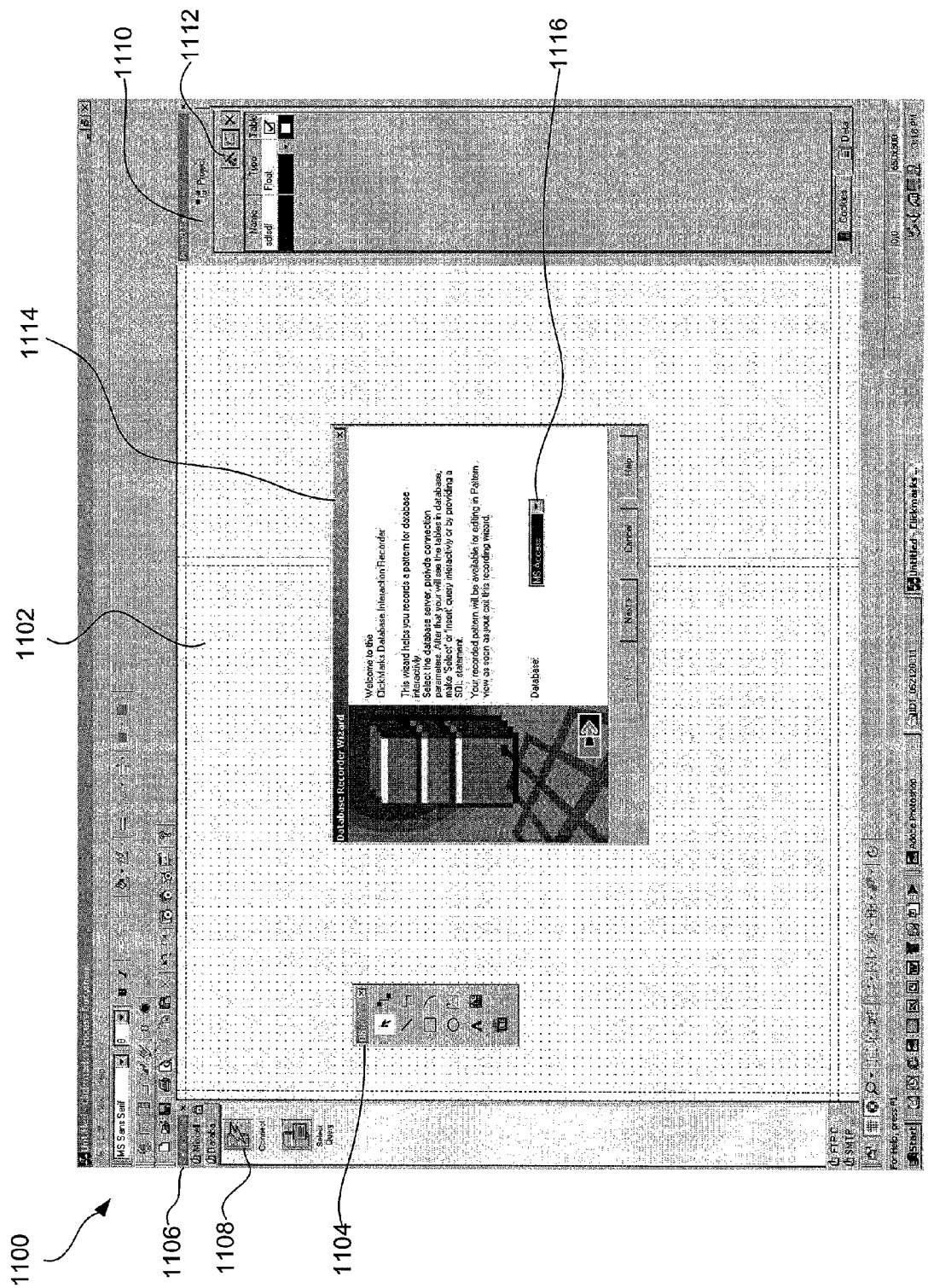
FIG. 11 illustrates a recording interface according to one embodiment.

FIG. 11 illustrates a recording interface 1100. As shown, a grid screen 1102 is provided. It is here that the graphical representation of an application for retrieving data from a data site is displayed. An Object Bar 1104 allows insertion of connectors and shapes into the grid screen. A Catalog Bar 1106 displays several types of specialized connectors and components. One specialized connector is the database connector 1108 representing a connection to a database. Selection of the tabs on the Catalog Bar displays different connectors and components. The items in these bars can be dragged and dropped into the grid screen and connected with connectors from the Object Bar. The Project Bar 1110 shows the names and types of variables being manipulated. Variables can be added by using a wizard, which starts upon selection of the wizard button 1112.

The following example illustrates creation of an application for retrieving a customer identifier (ID) from a database and creating an interface for displaying the customer ID on a particular type and/or model of device. As will be discussed in the example, the recording interface allows creation of different interfaces for different devices based on the capabilities of each.

Referring again to FIG. 11, a start screen 1114 is displayed upon selection of the wizard button. The database server is selected from the drop down menu 1116 and the Next button is selected. A database selection screen (not shown) is presented, which allows the user to select the desired database from which the desired data is to be retrieved.

Figure 12:
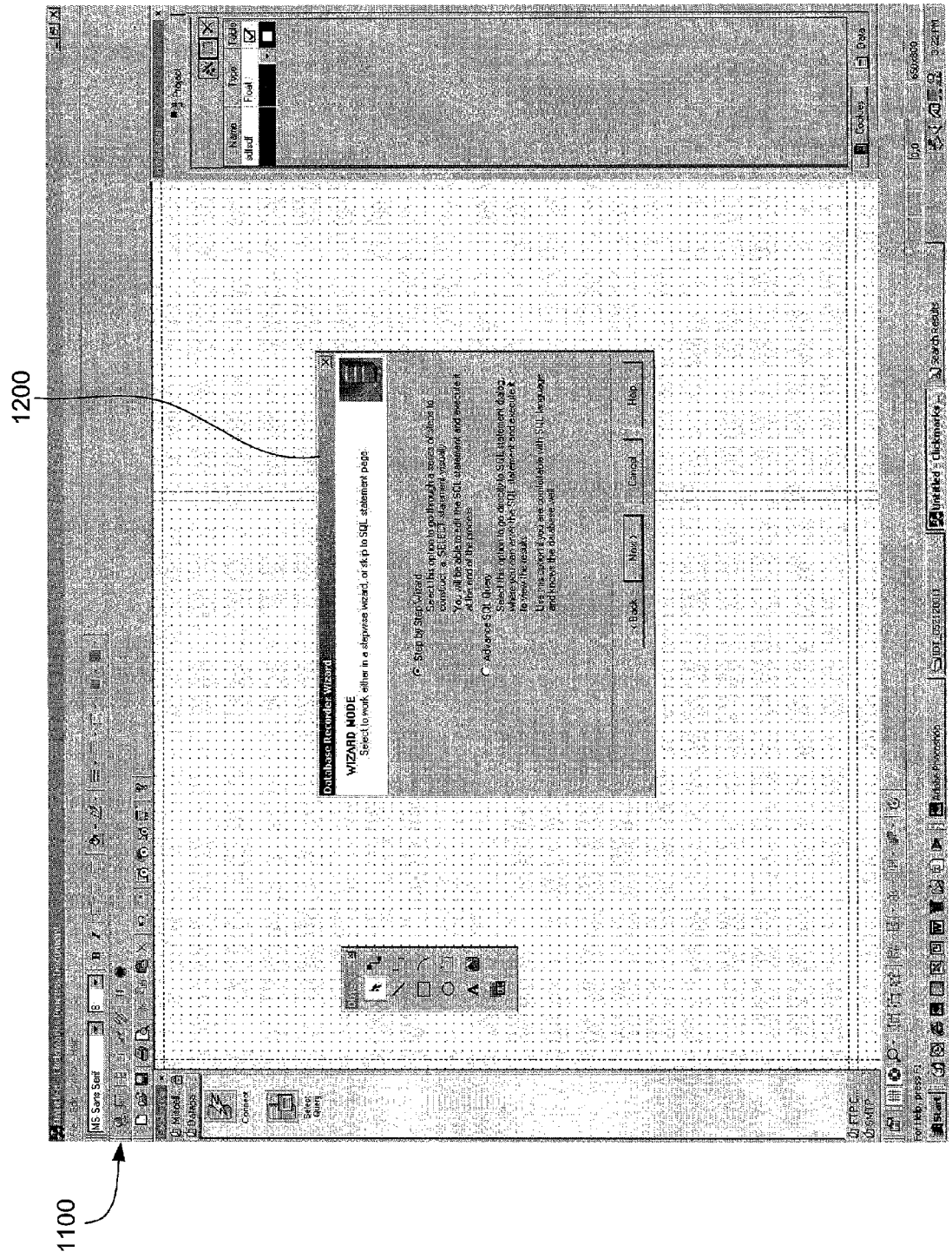
FIG. 12 illustrates a mode selection screen of the interface of FIG. 11.

FIG. 12 illustrates a mode selection screen 1200. Here, the user is allowed to select step by step mode or advanced mode. The desired mode is chosen and the Next button is selected. In this example, the step by step mode is shown.

Figure 13:
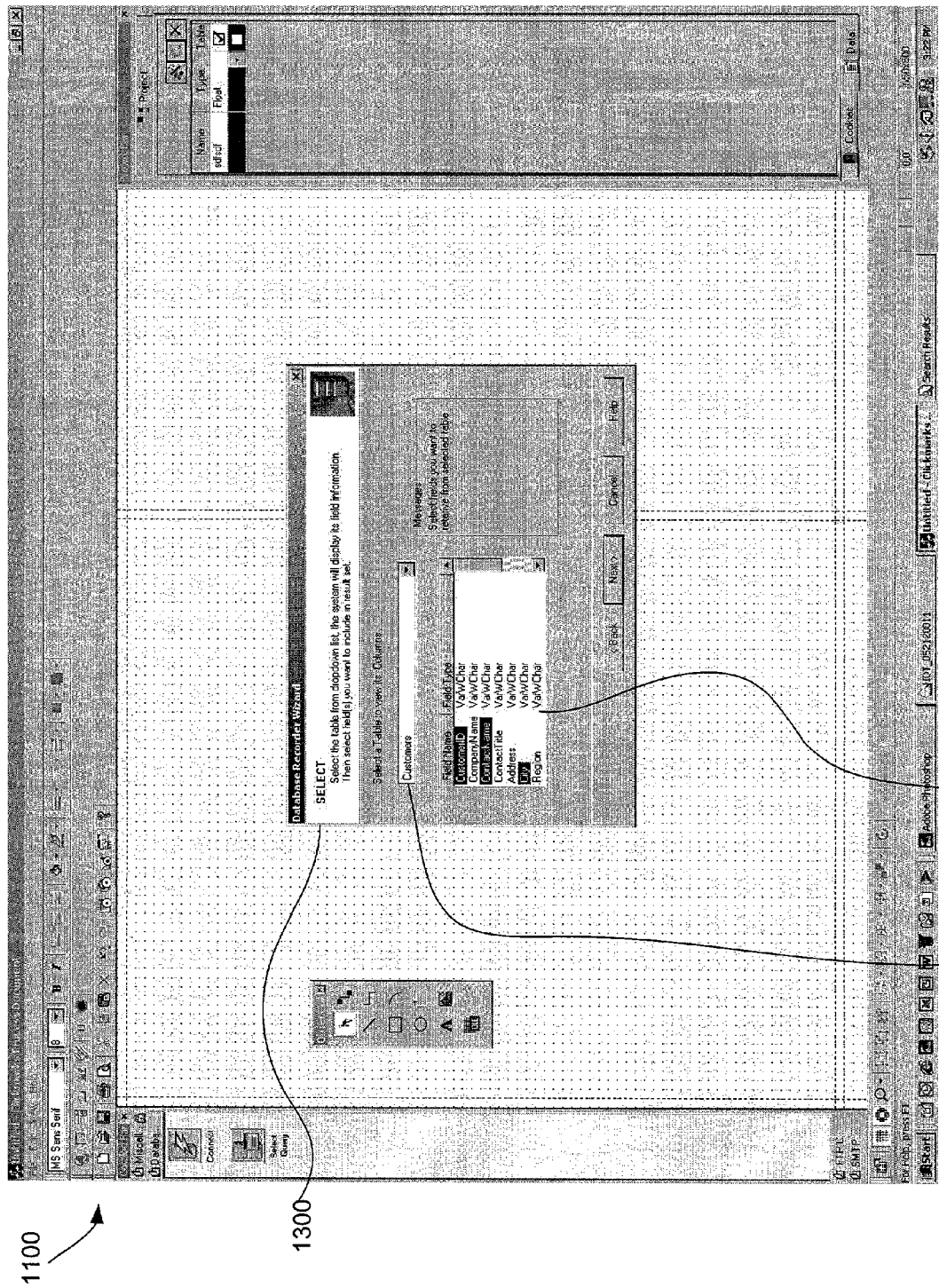
FIG. 13 shows a field selection screen of the interface of FIG. 11.

FIG. 13 shows a field selection screen 1300. The tables of the selected database are presented in the drop down menu 1302. The user is allowed to select which table to view. The fields of the selected table are presented in the fields display portion 1304. The user is allowed to select one or more fields from the field display portion. Note, multiple fields can be chosen using CTRL+R-click. The Next button is selected.

Figure 14:
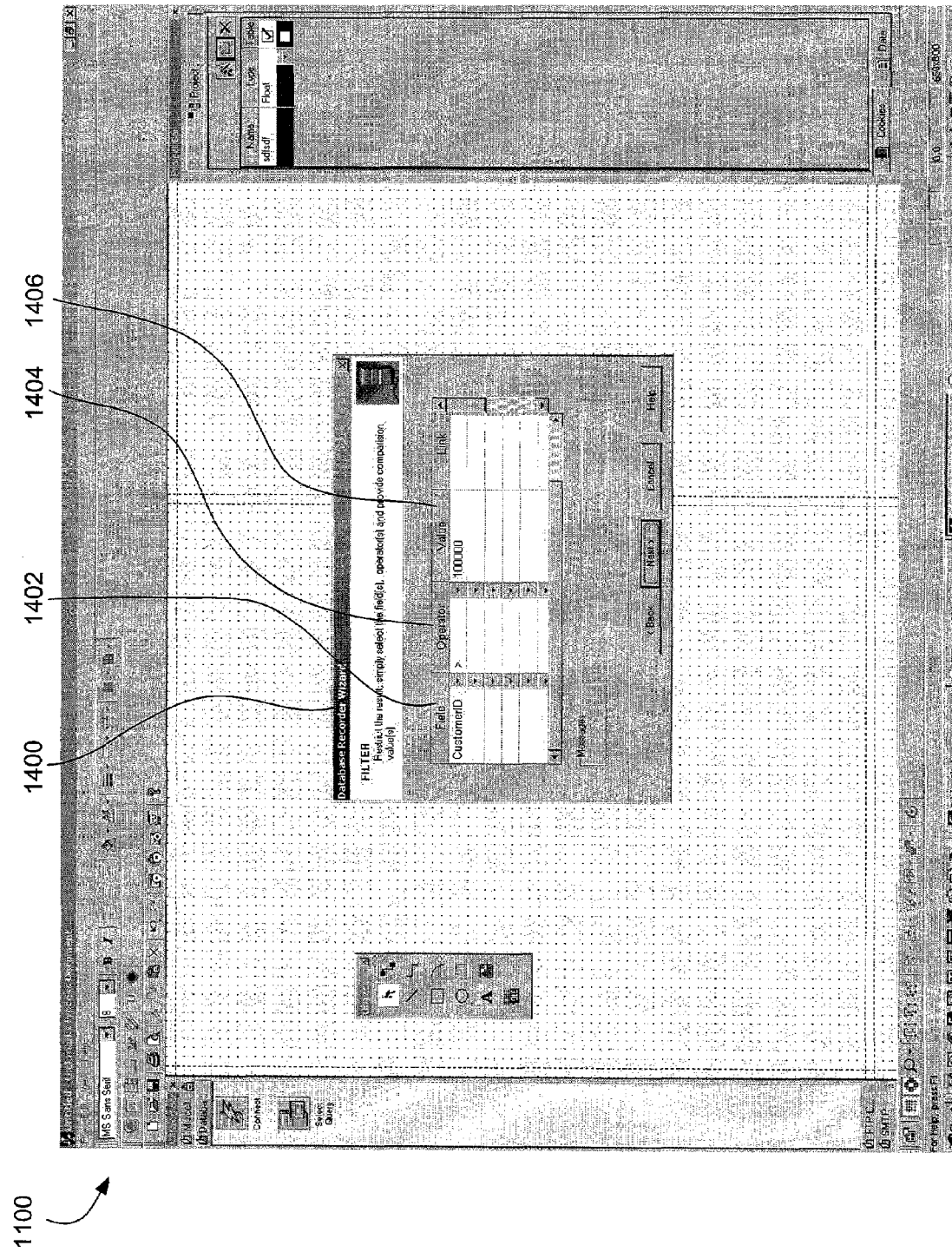
FIG. 14 depicts a filter screen of the interface of FIG. 11.

FIG. 14 depicts a filter screen 1400, which allows entry of filtering elements used to restrict the variables retrieved from the database. As shown, the field chosen in the field selection screen is displayed in the Field column 1402. Operands can be entered into the Operator column 1404 (or chosen from a drop down menu). Illustrative operands include >, <, ≧, ≦ and =. The Value column 1406 receives comparison values, to which the variables associated with the field are compared using the operand. The Next button is selected.

Figure 15:
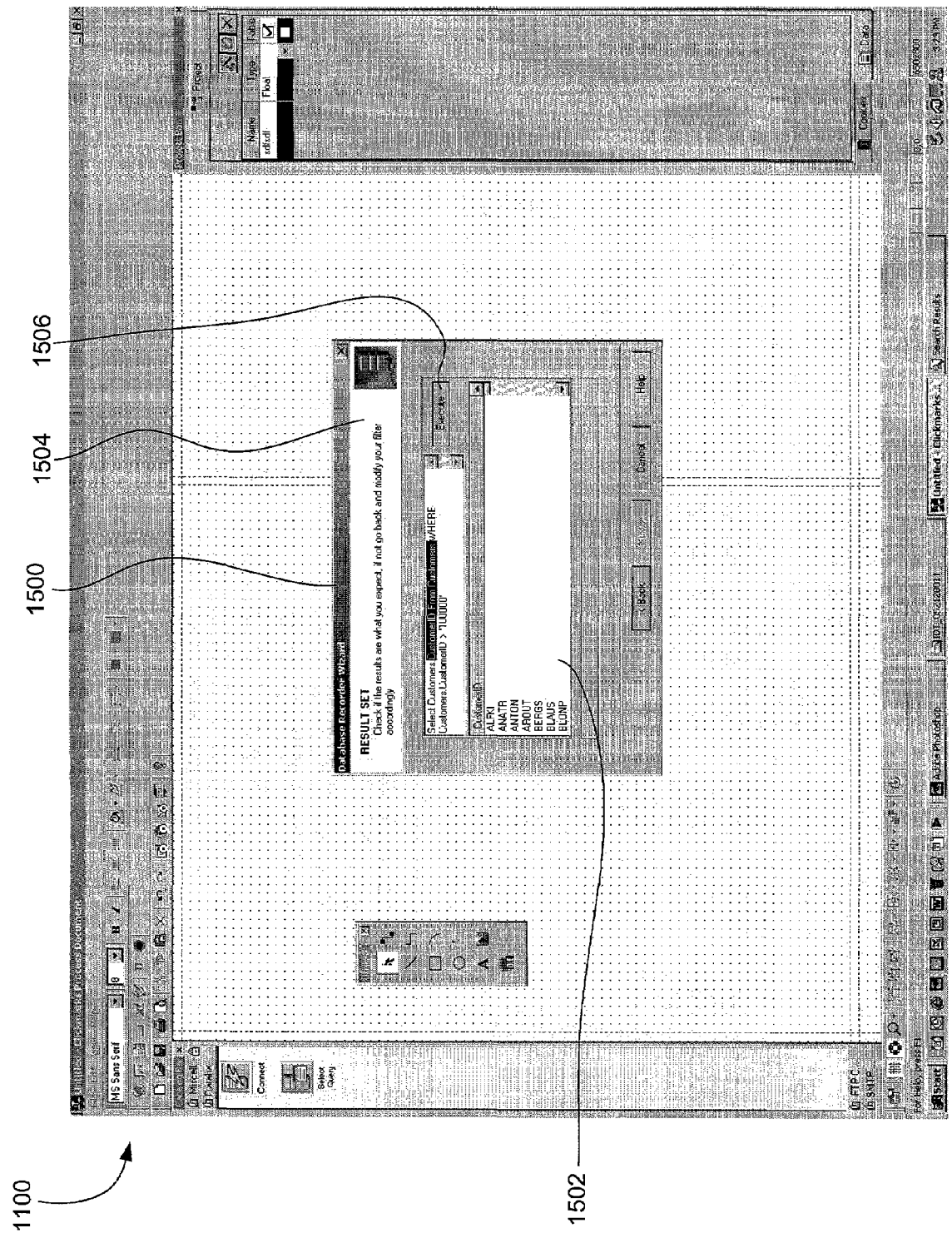
FIG. 15 illustrates a results screen of the interface of FIG. 11.

FIG. 15 illustrates a results screen 1500 displaying the results of the query in a results portion 1502. The query is also displayed in a query portion 1504. The query may be edited in the query portion to change the results returned. The Execute button 1506 is selected to re-execute the query and retrieve results of the edited query. The Next button is selected.

Figure 16:
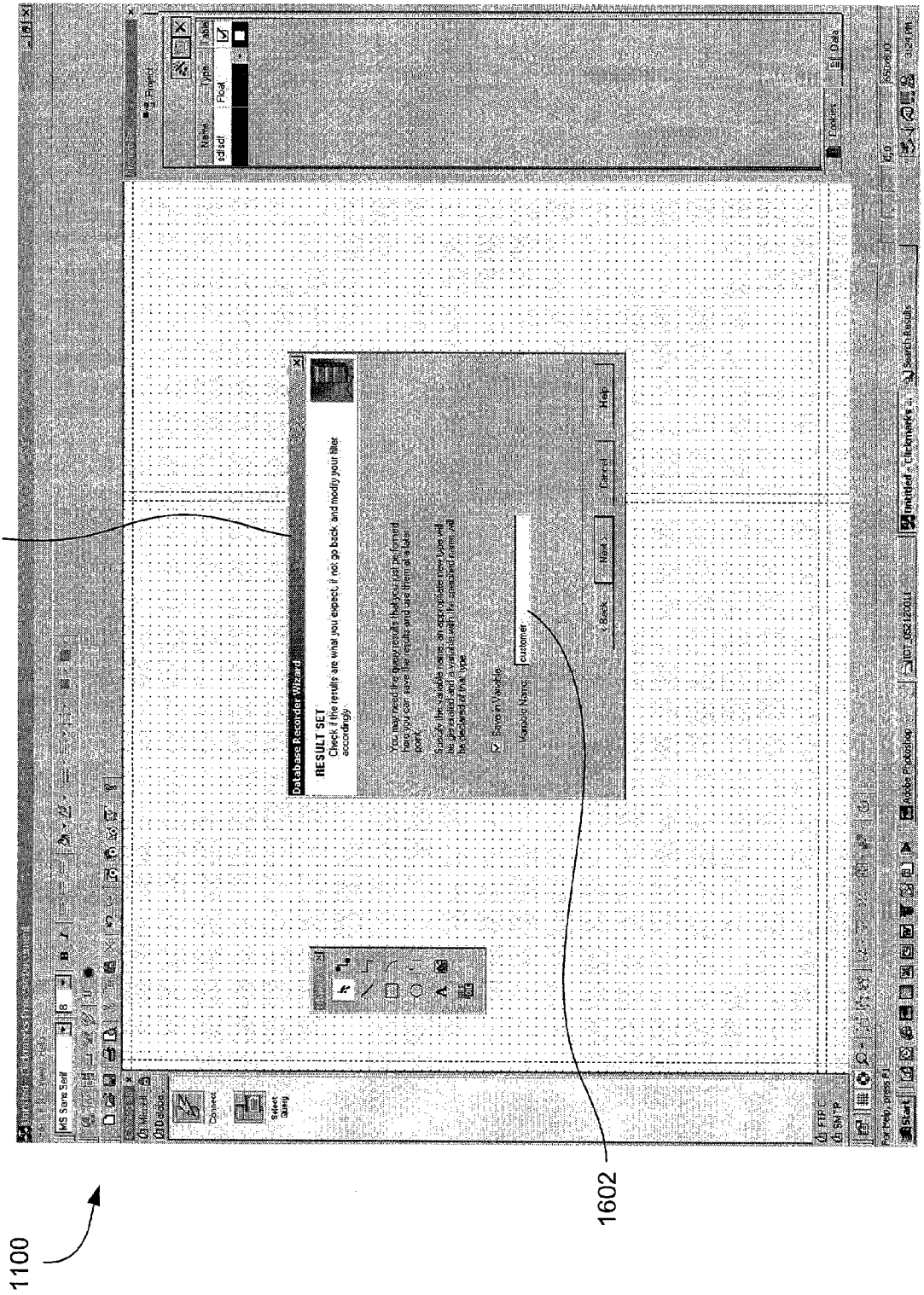
FIG. 16 illustrates an assign variable screen of the interface of FIG. 11.

FIG. 16 illustrates an assign variable screen 1600. Here, the results are assigned to a variable and saved for later use. The name of the variable is entered in the Variable Name field 1602. In this example, the variable is named "customer." The Next button is selected.

Figure 17:
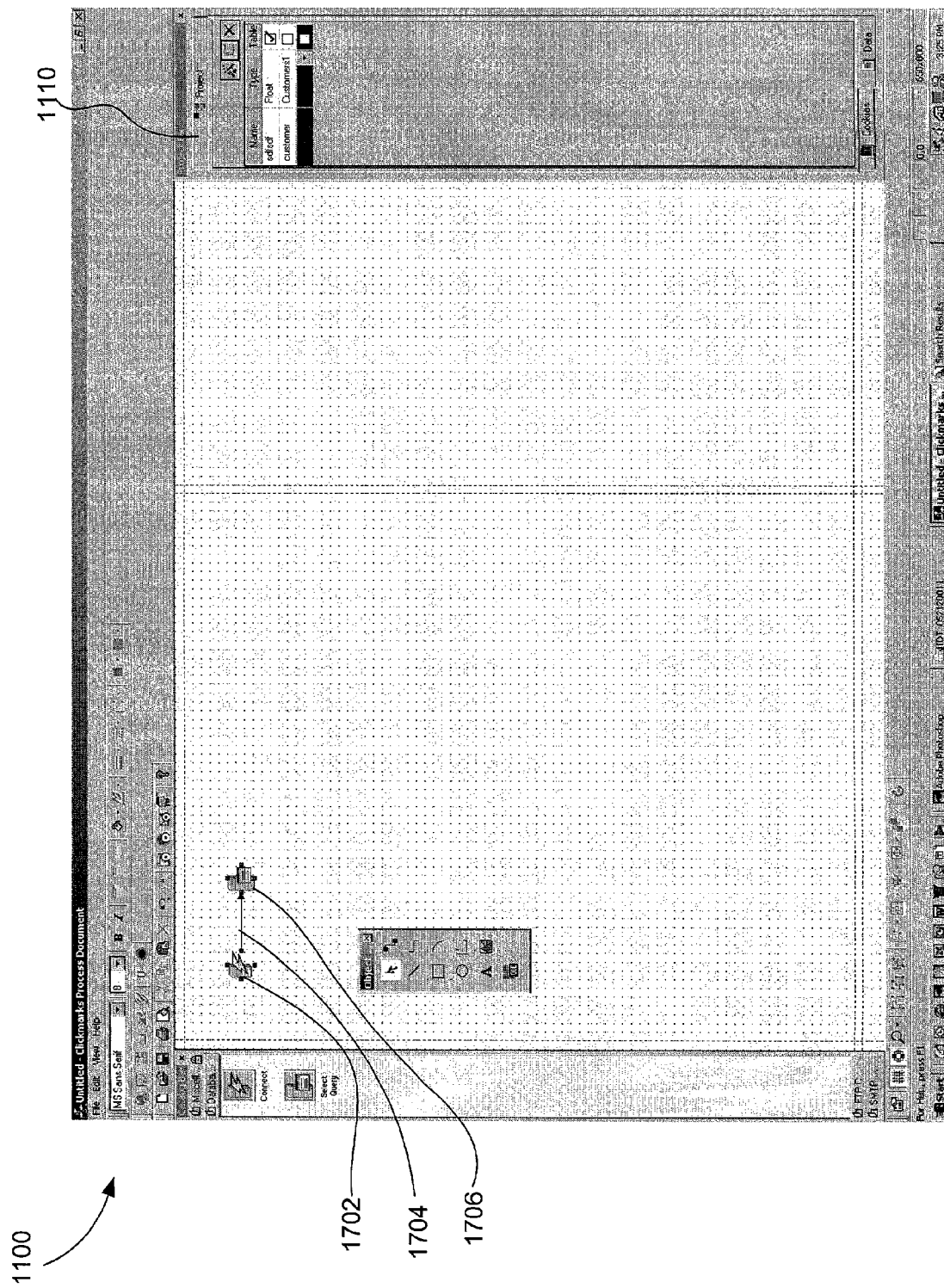
FIG. 17 shows the grid screen of the interface of FIG. 11.

FIG. 17 shows the grid screen 1100. The new variable "customer" now appears in the Project Bar 1110. A Database Connector 1702 is dragged from the Catalog Bar, as is a Select Query object 1704. A connector 1706 is dragged and dropped from the Object Bar to the grid screen and used to connect the Database Connector and the Select Query object.

Figure 18:
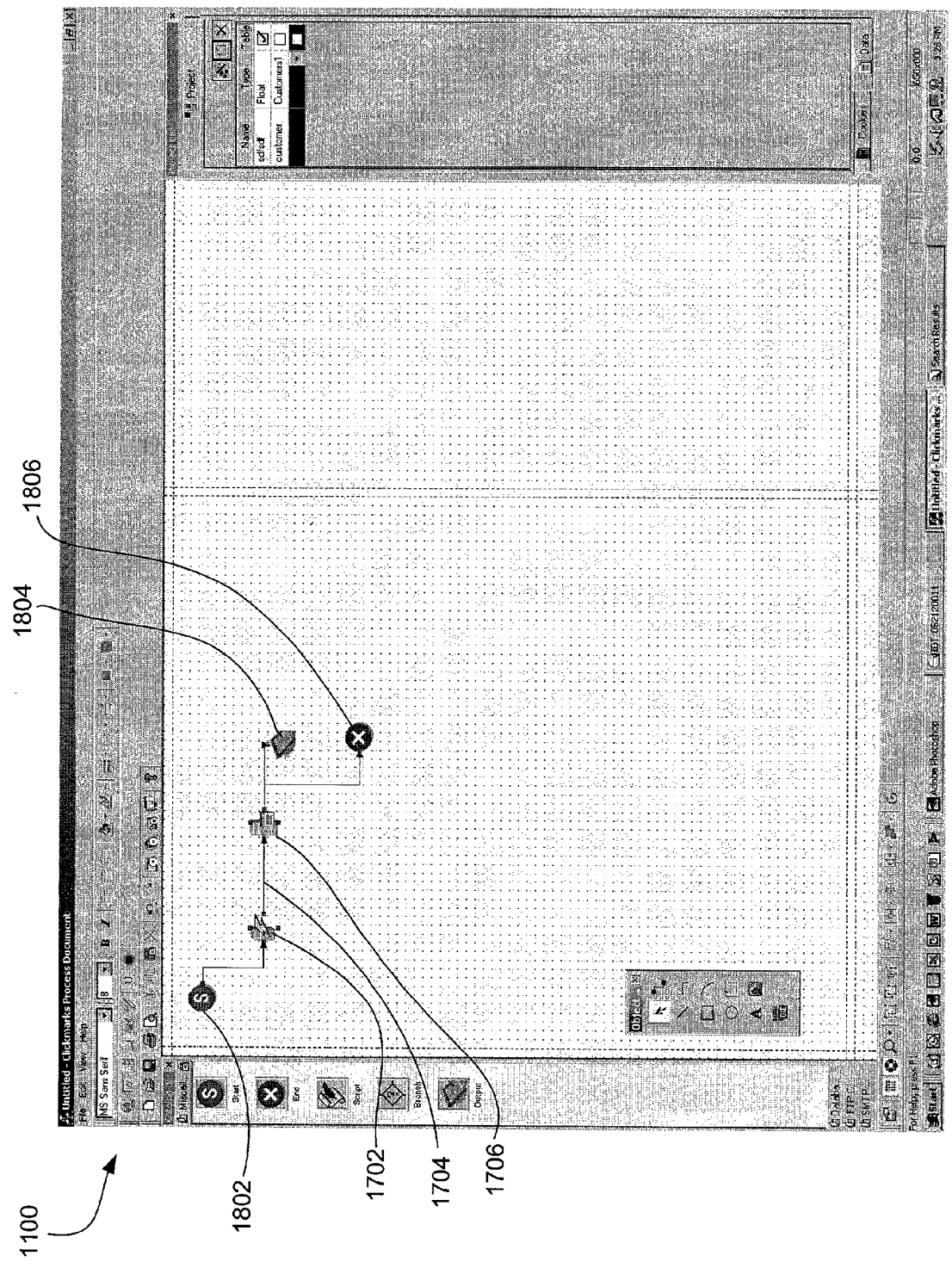
FIG. 18 shows the grid screen of FIG. 17 with additional objects added.

FIG. 18 shows the grid screen with additional objects added. Here, a Start Process object 1802, an Output object 1804, an End Process object 1806, and connectors have been added.

Figure 19:
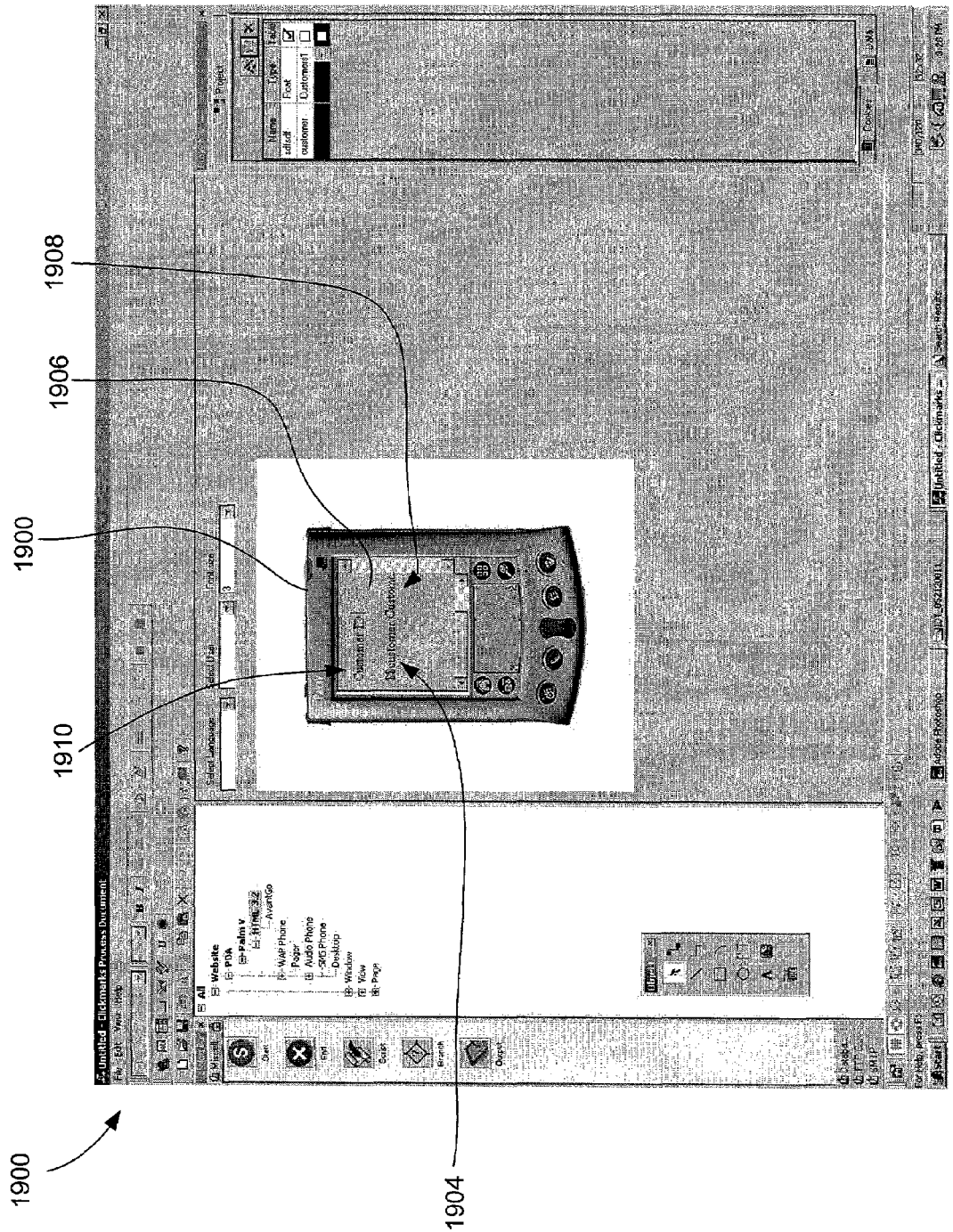
FIG. 19 illustrates a display specification screen of the interface of FIG. 11 from which the user can specify the manner in which variables are displayed on particular devices.

FIG. 19 illustrates a display specification screen 1900 from which the user can specify the manner in which variables are displayed on particular devices. As shown, various devices are shown in a tree structure. A type of device is selected, here the Palm V version of the PDA. A representation 1902 of the PDA is displayed. The identifier "customer" 1904 is added to the simulated display 1906 of the PDA. The variable field 1908 is also added to the display. During runtime, the actual result of the query is displayed in place of the identifier and variable field. Text may also be added for output in this screen. Here, the words "Customer ID:" 1910 have been added.

For example, a database program may have a table having an output with five columns. On a PDA, perhaps only four columns can be displayed on the display. The output can be set to show only four variables. Similarly, if only two columns of the table can be displayed on a phone, the output can be set to show only two variables.

Pattern Compiler

This component takes the validated pattern produced in the IDT described above, and prepares it for deployment to a set of targeted disconnected devices. Specifically, the compiler:
1. Invokes the Transcoder (described below) to compile each output node to a set of XHTML templates.
2. Selects only the XHTML template that applies to the current target device, and inserts that template into the output node description in the pattern.
3. Makes additional optimizations to the pattern representation if desired.
4. Binary encodes the entire pattern description for efficient storage and loading on the device.

Note that the pattern compiler is not required to modify the original pattern description. Instead it can add a new pattern description for each target device for which it runs, into the pattern file. This pattern description is stored in a binary representation as outlined above, and is re-created whenever the pattern is changed. This is done by invoking the compiler manually when the pattern is changed (though the IDT can alert the designer and suggest re-running the compiler if he/she attempts to save a modified pattern).

Platform

Figure 20:
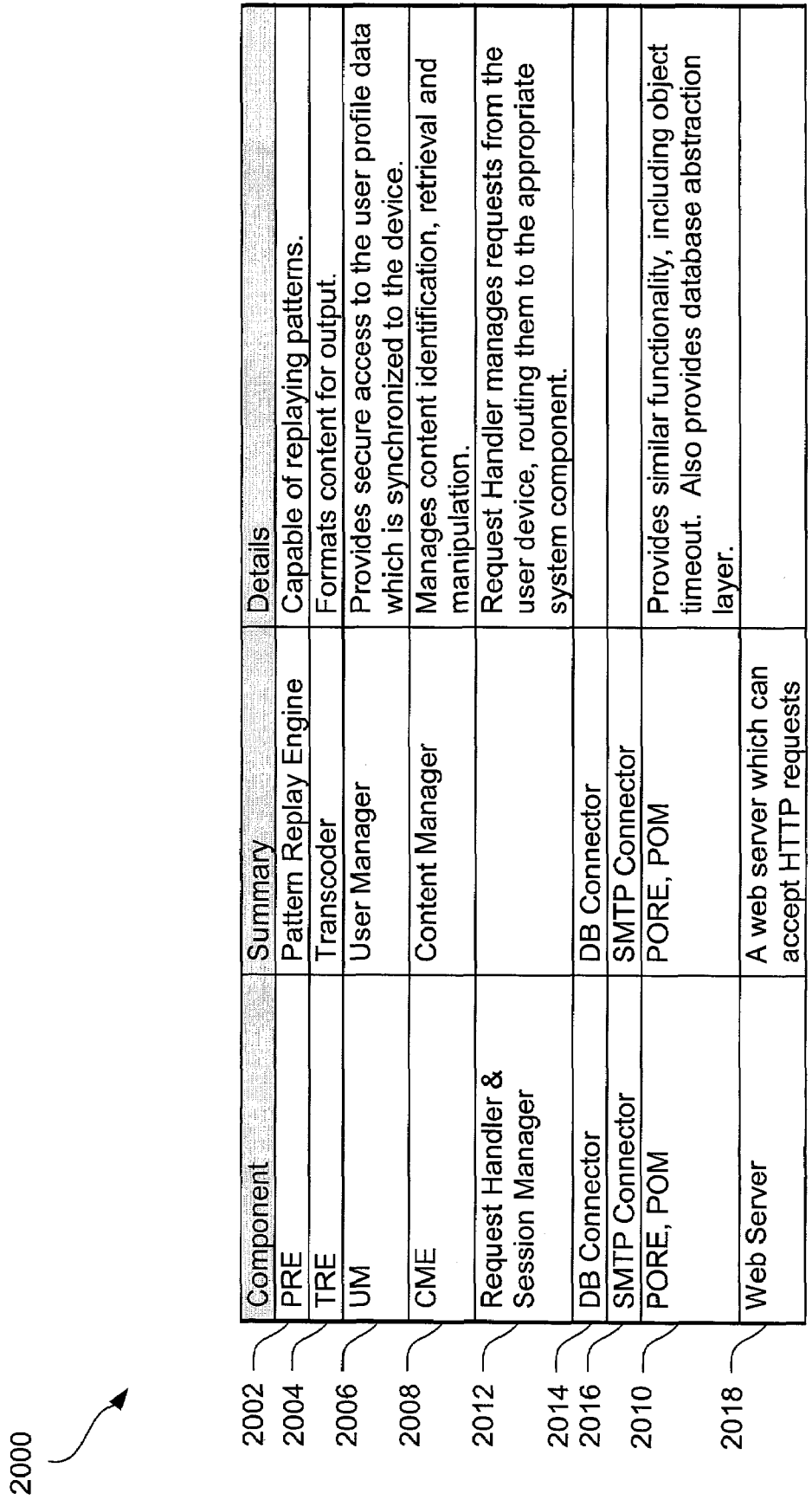
FIG. 20 is a table listing components of the platform that runs the disconnected applications according to an embodiment.

The platform residing on the device includes the components shown in the table 2000 of FIG. 20. The platform components are preferably implemented as distinct software modules (e.g. Windows DLLs) which work together to perform the necessary actions on behalf of the application. Depending on the memory constraints of the particular device, it may be preferable that the system does not consist of a single monolithic executable that has to be loaded into memory all at once. For example, connectors, which may not be used by an application at all, can be loaded and unloaded on demand.

Pattern Replay Engine (PRE) 2002

The Pattern Replay Engine (PRE) is the main controller for the application. The PRE loads and interprets the application, loading and unloading connectors on demand, and managing the state transitions.

Figure 21:
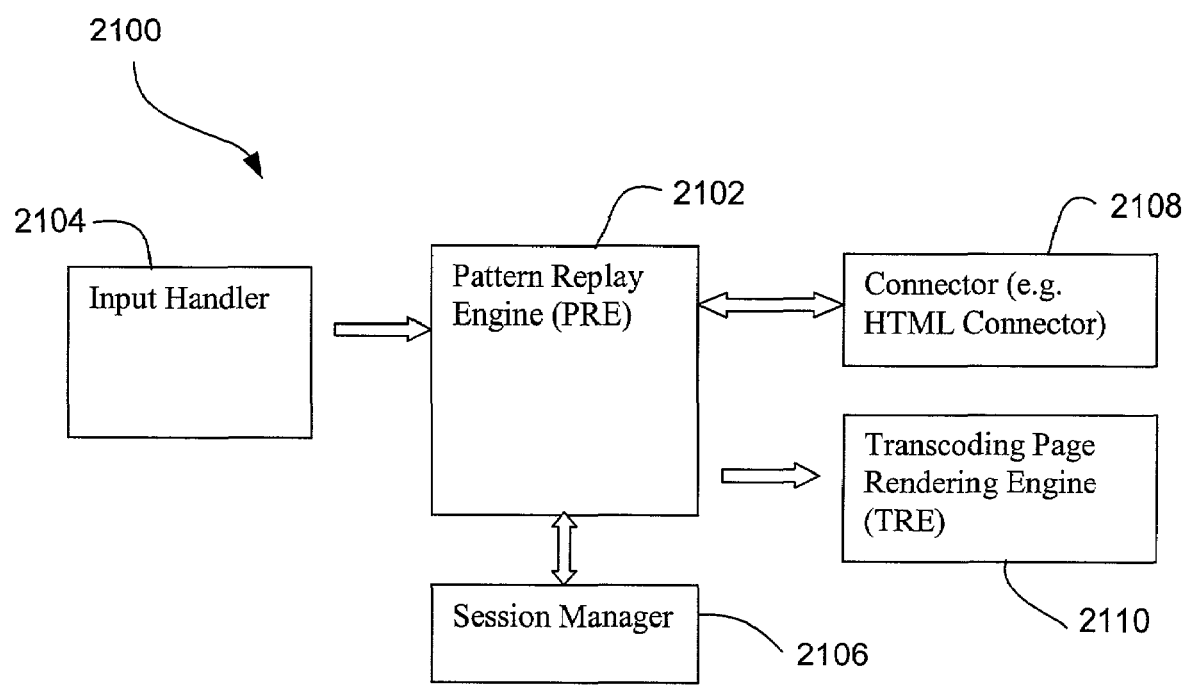
FIG. 21 is a block diagram providing a general overview of how the pattern replay engine interfaces with other major components of the system according to one embodiment.

FIG. 21 gives a general overview of how the PRE 2102 interfaces with other major components including the Input Handler 2104, session manager 2106, connector 2108, and Transcoder (TRE) 2110.

Based on the memory constraints on the device, an intelligent timeout mechanism can be used to cause the PRE to persist the session, unload all connectors, and go to "sleep". Ideally, the PRE remains poised for action from the user, and if no actions are detected in a certain amount of time, the PRE goes into sleep mode. Alternatively, the session can persist after each request, though may not be preferable because of performance limitations of the target devices.

The PRE is a request-driven component. The PRE's lifecycle begins when it receives a request from the Request Handler to execute a new pattern. The PRE loads the pattern and begins interpreting it. The pattern can be stored in an optimized and compressed format, such as binary XML. The PRE finds the pattern's start node, and loads the corresponding connector into memory (if it is not already loaded). It then invokes the connector to advance to the next state. This process of advancing to the next state continues until a state with an output node is encountered. In the meantime several states may be traversed, some requiring Javascript execution. Preferably, the Javascript engine is always loaded when the PRE is awake, particularly where the patterns use Javascript to encode the application logic.

When an output node is encountered, the Transcoder is invoked to render the output. The Transcoder is preferably always loaded while the PRE is awake, as it may be heavily used.

According to one embodiment, the PRE receives the request to make a transition from a particular state. Transitions from one state to another are made by executing actions. The PRE communicates with the appropriate connector (of the current state) to execute the current action in the request and get the new resulting state. Next, all script associated with the state is evaluated.

The PRE then calls the Transcoding Page Rendering Engine (TRE) to "flush" its output for display on the device. This means that any content, which has been queued for display in the TRE (while processing the request), is sent to a display screen of the device. Every state can potentially generate output to be displayed on the device, including internal states. This is a desirable feature as it means the designer can generate a status message, e.g. "Please wait while processing." etc. Finally, a script is called, which can initiate further state transitions from this script method if necessary.

More information about operation and functionality of the PRE is found in US patent application Ser. No. 09/942,080 (now abandoned) entitled SYSTEM, METHOD AND COMPUTER PROGRAM PRODUCT FOR PATTERN REPLAY USING STATE RECOGNITION, from which priority is claimed.

Transcoding Page Rendering Engine (TRE) 2004 (FIG. 20)

The Transcoding Page Rendering Engine (TRE or Transcoder) is a tool used to render content on any display environment. The TRE performs two very important functions:

1. De-compression—The output description is stored in a binary encoded format, and is de-compressed to a normal XML format for display in the browser.
2. Variable substitution—All variable and function call references in the output are replaced with actual values. This is performed by invoking the Javascript engine to resolve variables, or to invoke function calls.

When the pattern is saved, the output nodes are compiled and transcoded for the target device. The output pages stored in the pattern that is interpreted on the device therefore are ready for display, except for possible variable references in the page, that have to be resolved prior to displaying the page. The TRE therefore has as one of its functions the resolution of variable references in the output page.

Figure 22:
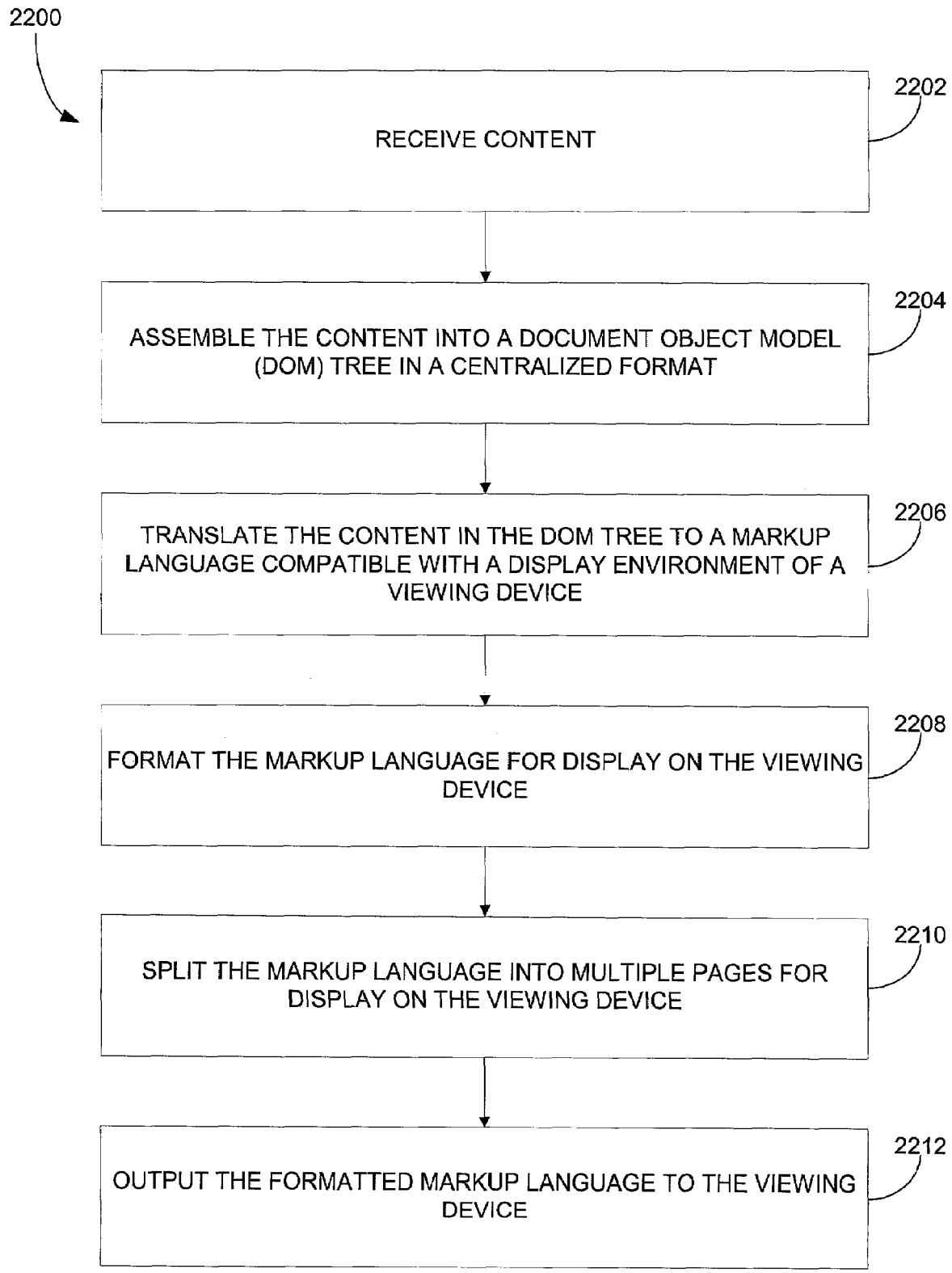
FIG. 22 is a flowchart of the transcoding process for rendering arbitrary content for display on a particular viewing device according to a preferred embodiment.

FIG. 22 is a flowchart of the TRE process 2200 for rendering arbitrary content for display on a particular viewing device according to a preferred embodiment of the present invention. In operation 2202, content is received. In operation 2204, the content is built into a DOM tree in an extended version of XHTML, referred to herein as CXHTML. Note that CXHTML is used herein by way of example only, and any suitable format can be used. For example, the format can be any XML form. This DOM tree is then processed in operation 2206 by several modules which translate the CXHTML into an appropriate markup language for the viewing environment and format this markup language to display best on the viewing device in operation 2208, which may include splitting the markup language into multiple pages. Note operation 2210. The markup language representation of the content can also be translated into the user's native language and/or character set. In operation 2212, the content is output to the viewing device.

Note that the TRE does not need to perform the initial steps of the transcoding process, because those steps have already been pre-computed at the server when the application was prepared for deployment (using the Pattern Compiler). These steps include:

1. Layout Compilation—The Layout XML description of the output node is compiled into a set of XHTML templates to use.
2. Template Selection—The correct XHTML template is pre-selected, based on the target device the application is being synchronized to.
3. Device Type and Device module invocation—The Device Type and Device modules can be run during compilation to further adjust the XHTML template.

Note that the compiler does not perform the final steps of the transcoding process, namely mark-up language translation and user agent module invocation. That is because these steps are not performed prior to variable substitution, which necessarily occurs at runtime.

Note that the TRE can process other types of output, such as audio, human language translation, character set rendering, style-sheet processing, etc.

More information about operation and functionality of the TRE is found in US Patent Application entitled SYSTEM, METHOD AND COMPUTER PROGRAM PRODUCT FOR PAGE RENDERING UTILIZING TRANSCODING, filed non-provisionally Aug. 28, 2001 under Ser. No. 09/942, 051 (now abandoned) and assigned to common assignee Clickmarks, Inc., and which is herein incorporated by reference.

User Manager (UM) 2006 (FIG. 20)

The User Manager (UM) manages user profile and privilege information. When the device is synchronized with the server, the current user's profile is also synchronized to the device. The user can be allowed to update the profile from the device. The UM allows multiple user profiles to be resident on the device. In order to use the application, the user may be required to login with his or her username and password on the device so that the UM can unlock that user's profile. Thus, pattern replay can be made dependent upon user profile information such as whether the user is authorized to run the pattern, how the pattern functions for a particular user, etc.

Content Manager (CME) 2008

The CME manages content identification, retrieval and manipulation.

Mobile PORE & POM

The PORE implements the persistent object repository, using the POM. One feature is object timeout, which is used by the session manager.

Request Handler (RH) 2012

The RH manages requests from the user, routing them to the appropriate system component, such as the PRE. The RH accepts the following illustrative request types:

1. Pattern Replay Request.
2. Authentication Request.

Note that these two request types can be combined in a single request to the request handler, in which case the request handler will first authenticate the user using the UM, and then invoke the PRE.

Mobile Session Manager (SM) 2012

The SM maintains the session state persistently on the device while the user is logged-on. Session security and system timeout settings are honored by the SM to protect the user's session data. As on the server, the session is used to store the pattern state.

Mobile Database (DB) Connector 2014

The DB Connector is invoked by the PRE to handle database operations.

Mobile SMTP Connector 2016

The SMTP Connector is invoked by the PRE to handle SMTP operations. The SMTP connector provides the designer the ability to create a template to send out emails. The message is placed in the local database on the device, and synchronized to the server during device synchronization. During synchronization, the server immediately sends out the message as soon as it is copied from the device. Alternatively, the device's outbox can be used.

Web Server 2018

The application server is resident on the device and is capable of responding to basic HTTP requests, including a mechanism for invoking server plugins similar to CGI or Servlet mechanism. An HTTP server can be provided which can accept and respond to HTTP requests coming from the browser on the device itself. Specifically, the server may accept requests for serving up static HTML files, as well as invoking the request handler using the CGI standard. Alternatively the Servlet API can be used, but is far more complex to implement as a Servlet container implementation would be required. An HTTP 1.0 or 1.1 compliant server may be used, for example.

Web Browser

Any HTML/XHTML/WML or other mark-up based browser can be used to render the application UI and accept user input. The browser is capable of connecting to the application server described above.

Database Server

An SQL compliant database server resident on the device is used to store persistent platform and application data.

Synchronization

Several modules can be provided that integrate with a synchronization server for synchronizing the applications and data to the device. These modules are:

Platform Sync—Synchronizes global platform settings and data
  User Profile Sync—Synchronizes user profiles to the device
  Email Sync—Synchronizes the outbox from the device, and sends out the messages
  Pattern Synchronizer—Synchronizes data to the device by invoking a synchronization pattern associated with the application pattern In addition, an application deployment feature can be added, which allows the application to be deployed. This feature uploads the patterns and updates the necessary synchronization server configuration to synchronize the pattern, and the platform if necessary, to the device. The platform itself is managed as an application using a synchronization application management feature. The patterns installed on a particular device are managed using the platform's own administration tool.

According to one embodiment, pattern deployment for the two types of patterns includes the following steps.

Synchronization Pattern:
1. Pattern is installed to a host server, in a special Synchronization patterns directory.
2. Synchronization server is updated to call the synchronization pattern during synchronization. This can be done through a plugin.

Disconnected Pattern:
1. Pattern is installed to the host server, so it can be administered (assigned to different users/groups).
2. If the pattern is assigned to a user, the pattern is synchronized to that user's device when the device is next synchronized. This can be done through a plugin, which checks with the pattern manager to see what patterns have been assigned to the current user, and then synchronizes any new or updated patterns to the device. This may be done using any suitable mechanism for synchronizing data files to the device, as will be appreciated by one skilled in the art.

Since the patterns are files, they can be read directly through the file system by the Sync server during synchronization. In other words, only a single copy of the file may be needed, which is shared by the host platform server and the synchronization server.

Note that a synchronization client may be installed to the device, and may be installed as a plugin, freestanding application, etc. Also, note that user authentication may be required prior to synchronization.

Platform Sync

This module synchronizes any global platform settings that are needed to run the platform on the device. These settings are updated to the device during each synchronization session.

This module also synchronizes the platform itself to the device, when the device is first synchronized, or whenever the platform is updated. This is most likely done using a synchronization mechanism for deploying applications to the device.

User Profile, Email and Pattern synchronization configuration for the device is also performed when the platform is first synchronized to the device.

User Profile Sync

This module synchronizes all user profiles that are already on the device to the device. In addition, if the current user (the user may be required to authenticate during synchronization) is not on the device, that profile is synchronized as well. User profiles can automatically be removed from the device by the system after a certain period of not being used.

This implies that multiple users can use the device and the applications on the device. However, different users may have different sets of patterns assigned to them. Thus, each user is shown only his or her patterns (associated with the user via short-cuts or filename extension mechanisms).

Verification that the user has permission to replay the pattern may be required before replay is allowed. This requires that the user authenticates prior to starting the replay of any pattern. While the session security timeout period hasn't expired, the session can be used. For example, the user authenticates and starts replaying pattern A. After several interactions, the user turns off the device. Later, the user turns the device back on and launches the Disconnected platform application. The user now sees the last displayed output again, and can continue replaying from there. If the session security timeout has expired, the user can be asked to login again before they can continue. If the session has expired, the user may be asked to login again, and the pattern may start from the beginning.

Email Sync

This module sends out any messages stored in the outbox area of the device resident database. Note that the platform may provide its own outbox for holding messages sent through the SMTP connector. This outbox is synchronized to the server, and the messages are sent through an SMTP server. The platform may also use the device native outbox (e.g. Pocket Outlook).

Pattern Sync

This module is invoked whenever a pattern is being synchronized. It synchronizes any data produced/changed by the pattern from the device to the server, and vice versa. Which data to synchronize is specified in the synchronization pattern.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer implemented method comprising:
receiving user input on a device;
replaying a pattern on the device, wherein the pattern includes a collection of states, and at least a portion of the states includes logic for interacting with a program stored on the device and wherein the pattern further includes user interface screens stored as templates that are filled in with retrieved data;
managing navigation of the pattern based on at least one of the user input and application logic of the pattern;
retrieving data from the program utilizing at least one connector as specified in the pattern;
outputting the retrieved data;
periodically replaying the pattern for retrieving the data for later synchronization to the device; and
wherein information stored in the pattern further includes interfaces presented to a user, actions performed in submitting data, parameters required for completing a transaction, parameters submitted by the user, user navigation within a transaction process, data processing to provide functionality, and the retrieved data from an external data source.

2. The method as recited in claim 1, further comprising replaying a synchronization pattern for synchronizing data between the device and the external data source.

3. The method as recited in claim 2, wherein the data synchronized includes at least one of: user profile information, electronic mail, and another pattern.

4. The method as recited in claim 1, wherein replaying of the pattern is dependent upon user profile information.

5. The method as recited in claim 1, wherein the at least one connector interfaces with at least one of: a second program resident on the device, a network data site, and a remote application.

6. A computer program product embodied on a computer readable storage medium that is executable by a computer, the computer program product comprising:
computer code for receiving user input on a device; computer code for replaying a pattern on the device, the pattern including a collection of states, at least a portion of the states including logic for interacting with a program;
computer code for managing navigation of the pattern based on at least one of the user input and application logic of the pattern;
computer code for retrieving data from the program utilizing at least one connector as specified in the pattern;
computer code for outputting the retrieved data;
computer code for replaying a synchronization pattern for synchronizing data between the device and an external data source; and
computer code for periodically replaying the pattern for retrieving the data for later synchronization to the device;
wherein user interface screens are included in the pattern;
wherein the user interface screens are stored as templates that are filled in with the retrieved data wherein replaying of the pattern is dependent at least in part upon user profile information; and
wherein information stored in the pattern further includes interfaces presented to a user, actions performed in submitting data, parameters required for completing a transaction, parameters submitted by the user, user navigation within a transaction process, data processing to provide functionality, and the retrieved data from an external data source.

7. A system, comprising:
hardware storing:
logic for receiving user input on a device;
logic for replaying a pattern on the device, the pattern includes a collection of states, and at least a portion of the states includes logic for interacting with a program stored on the device and wherein the pattern further includes user interface screens stored as templates that are filled in with retrieved data;
logic for managing navigation of the pattern based on at least one of the user input and application logic of the pattern;
logic for retrieving data from the program utilizing at least one connector as specified in the pattern;
logic for outputting the retrieved data; and
logic for periodically replaying the pattern for retrieving the data for later synchronization to the device; and
wherein information stored in the pattern further includes interfaces presented to a user, actions performed in submitting data, parameters required for completing a transaction, parameters submitted by the user, user navigation within a transaction process, data processing to provide functionality, and the retrieved data from an external data source.

8. A computer implemented method comprising:
selecting functional computer code that processes data for providing functionality on a device, the functional computer code not including coding to native application program interfaces of the device;
programming at least one connector to interface with at least one program on the device for retrieving data for processing;
generating an output node for outputting the processed data from the device;
storing the functional computer code, connector, and output node in a device-resident pattern for installation on the device, wherein the device resident pattern includes user interface screens stored as templates that are filled in with the retrieved data; and
transcoding a user interface screen of an application for output from the device;
wherein the retrieved data is processed by the functional computer code upon replaying of the device-resident pattern for providing the functionality; and
wherein information stored in the device-resident pattern further includes interfaces presented to a user, actions performed in submitting data, parameters required for completing a transaction, parameters submitted by the user, user navigation within a transaction process, data processing to provide functionality, and the retrieved data from an external data source.

9. The method as recited in claim 8, further comprising storing in the device-resident pattern: a connector for interfacing with a remote data source.

10. The method as recited in claim 8, wherein variable references in the output node is resolved during replay of the device-resident pattern.

11. The method as recited in claim 8, further comprising generating a synchronization pattern for managing a data communication between the device and the external data source.

12. The method as recited in claim 8, further comprising periodically replaying the device-resident pattern for retrieving data for later synchronization to the device.

13. A computer program product embodied on a computer readable storage medium that is executable by a computer, the computer program product comprising:
  computer code that selects functional computer code that processes data for providing functionality on a device, the functional computer code not including coding to native application program interfaces of the device;
  computer code for programming connectors to interface with programs on the device for retrieving data for processing;
  computer code for generating output nodes for outputting the processed data from the device;
  computer code for storing the functional computer code, connectors, and output nodes in a device-resident pattern for installation on the device, wherein the device resident pattern includes user interface screens stored as templates that are filled in with the retrieved data; and
  computer code for graphically displaying representations of the functional computer code, the connectors, and the output nodes on a display, wherein a user is allowed to connect the graphically displayed representations for specifying a flow of the device-resident pattern;
  wherein the retrieved data is processed by the functional computer code upon replaying of the device-resident pattern for providing the functionality;
  wherein information stored in the device-resident pattern further includes interfaces presented to the user, actions performed in submitting data, parameters required for completing a transaction, parameters submitted by the user, user navigation within a transaction process, the data processing to provide the functionality, and the retrieved data from an external data source.

14. A system, comprising:
  hardware storing:
  logic for selecting functional computer code that processes data for providing functionality on a device, the functional computer code not including coding to native application program interfaces of the device;
  logic for programming connectors to interface with programs on the device for retrieving data for processing;
  logic for generating output nodes for outputting the processed data from the device;
  logic for storing the functional computer code, connectors, and output nodes in a device-resident pattern for installation on the device, wherein the device resident pattern includes user interface screens stored as templates that are filled in with the retrieved data; and
  logic for graphically displaying representations of the functional computer code, the connectors, and the output nodes on a display, wherein a user is allowed to connect the graphically displayed representations for specifying a flow of the device-resident pattern;
  wherein the retrieved data is processed by the functional computer code upon replaying of the device-resident pattern for providing the functionality;
  wherein information stored in the device-resident pattern further includes interfaces presented to the user, actions performed in submitting data, parameters required for completing a transaction, parameters submitted by the user, user navigation within a transaction process, the data processing to provide the functionality, and the retrieved data from an external data source.

15. A computer implemented method comprising:
  creating a device-resident pattern for installation on a client device;
  wherein the device-resident pattern is not coded to native application program interfaces of the client device;
  wherein the device-resident pattern utilizes connectors for interfacing with at least one of an existing program and an interface of the client device;
  wherein the device-resident pattern provide functionality when replayed on the client device;
  wherein the device resident pattern includes user interface screens stored as templates that are filled in with retrieved data;
  transferring the device-resident pattern to the client device;
  generating a synchronization pattern for managing a data communication between the client device and an external data source, and transferring the synchronization pattern to the client device; and
  wherein information stored in the device-resident pattern further includes interfaces presented to a user, actions performed in submitting data, parameters required for completing a transaction, parameters submitted by the user, user navigation within a transaction process, data processing to provide the functionality, and the retrieved data from an external data source.

16. A computer implemented method, comprising:
  selecting functional computer code data processes data for providing functionality on a device, the computer code not including coding to native application program interfaces of the device;
  programming at least one connector to interface with at least one program on the device for retrieving data for processing;
  generating an output node for outputting the processed data from the device;
  transcoding a user interface screen of the application for output on the device;
  selecting a connector for interfacing with a remote data source;
  storing the functional computer code, connectors, and output node in a device-resident pattern for installation on the device;
  graphically displaying representations of the functional computer code, connector, and output node on a display, wherein a user is allowed to connect the representations for specifying a flow of the pattern;
  wherein variable references in the output nodes are resolved during replay of the pattern;
  wherein the retrieved data is processed by the functional computer code upon replaying of the pattern for providing the functionality;
  generating a synchronization pattern for managing a data communication between the device and an external data source;

generating a cron pattern for retrieving data for later synchronization to the client device;
replaying the cron pattern for retrieving data for later synchronization to the client device;
receiving user input on the device;
replaying the synchronization pattern for synchronizing data between the device and an external data source;
wherein the data synchronized includes at least one of: user profile information, electronic mail, and another pattern;
replaying the device-resident pattern on the device;
wherein replaying of the pattern is dependent upon user profile information;
retrieving data based on the user input utilizing at least one connector as specified in the device-resident pattern;
wherein the connector interfaces with at least one of: a program resident on the device, a network data site, and a remote application;
processing the data based on the user input as specified in the device-resident pattern; and
outputting the processed data.

* * * * *

UNITED STATES PATENT AND TRADEMARK OFFICE
CERTIFICATE OF CORRECTION

PATENT NO.        : 7,574,711 B2
APPLICATION NO.   : 10/146096
DATED             : August 11, 2009
INVENTOR(S)       : Zondervan et al.

It is certified that error appears in the above-identified patent and that said Letters Patent is hereby corrected as shown below:

On the Title Page:

Related U.S. Application Data Item (60); please replace "Provisional application No. 60/341,340, filed on Dec. 14, 2001, provisional application No. 60/283,781, filed on Apr. 12, 2001." with --Provisional application No. 60/341,340, filed on Dec. 14, 2001.--.

Claim 1, col. 21, line 24; please replace "method" with --method,--;
Claim 1, col. 21, line 34; please insert --the-- before "data" and after "retrieving";
Claim 6, col. 22, line 6; please remove "and";
Claim 6, col. 22, line 12; please replace "data" with --data;--";
Claim 7, col. 22, line 25; please replace "device" with --device,--;
Claim 7, col. 22, line 34; please insert --the-- before "data" and after "retrieving";
Claim 8, col. 22, line 46; please replace "method" with --method,--;
Claim 8, col. 22, line 60; please remove "and";
Claim 8, col. 23, line 3; please insert --the- before "data" and after "process,";
Claim 8, col. 23, line 4; please insert --the-- before "functionality" and after "provide";
Claim 15, col. 24, line 14; please replace "method" with --method,--;
Claim 15, col. 24, line 22; please replace "provide" with --provides--; and
Claim 16, col. 24, line 40; please replace "data" with --that--.

Signed and Sealed this
Third Day of January, 2012

David J. Kappos
*Director of the United States Patent and Trademark Office*